United States Patent
Shimizu et al.

(10) Patent No.: US 7,472,125 B2
(45) Date of Patent: Dec. 30, 2008

(54) METHOD FOR MANAGING A DATABASE SYSTEM

(75) Inventors: Akira Shimizu, Kokubunji (JP); Daisuke Ito, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 11/144,626

(22) Filed: Jun. 6, 2005

(65) Prior Publication Data

US 2006/0218205 A1 Sep. 28, 2006

(30) Foreign Application Priority Data

Mar. 24, 2005 (JP) ............................. 2005-086572

(51) Int. Cl.
*G06F 7/00* (2006.01)
*G06F 17/30* (2006.01)

(52) U.S. Cl. ............................................ 707/10; 707/8
(58) Field of Classification Search .............. 707/1–206
See application file for complete search history.

(56) References Cited

U.S. PATENT DOCUMENTS

| | | | | | |
|---|---|---|---|---|---|
| 5,522,044 | A | * | 5/1996 | Pascucci et al. ............. | 709/222 |
| 5,598,566 | A | * | 1/1997 | Pascucci et al. ............. | 713/324 |
| 5,884,072 | A | * | 3/1999 | Rasmussen .................. | 709/223 |
| 5,918,229 | A | * | 6/1999 | Davis et al. .................. | 707/10 |
| 5,950,188 | A | * | 9/1999 | Wildermuth .................. | 707/3 |
| 6,115,713 | A | * | 9/2000 | Pascucci et al. .............. | 707/10 |
| 6,151,602 | A | * | 11/2000 | Hejlsberg et al. ............. | 707/10 |
| 6,493,717 | B1 | * | 12/2002 | Junkin ......................... | 707/102 |
| 6,526,406 | B1 | * | 2/2003 | Suzuki et al. ................. | 707/10 |
| 6,801,921 | B2 | * | 10/2004 | Tsuchida et al. ............. | 707/204 |
| 6,820,085 | B2 | * | 11/2004 | Nishizawa et al. ............ | 707/10 |
| 6,829,623 | B2 | * | 12/2004 | Tsuchida et al. ............. | 707/204 |
| 2002/0198883 | A1 | * | 12/2002 | Nishizawa et al. ............ | 707/10 |
| 2003/0072263 | A1 | * | 4/2003 | Peterson ...................... | 370/235 |
| 2003/0097570 | A1 | * | 5/2003 | Wheeler et al. .............. | 713/180 |
| 2003/0097573 | A1 | * | 5/2003 | Wheeler et al. .............. | 713/182 |
| 2003/0120634 | A1 | * | 6/2003 | Koike et al. .................. | 707/1 |
| 2004/0030703 | A1 | | 2/2004 | Bourbonnais et al. | |
| 2004/0153481 | A1 | * | 8/2004 | Talluri ......................... | 707/200 |
| 2005/0182888 | A1 | * | 8/2005 | Murotani et al. .............. | 711/1 |

OTHER PUBLICATIONS

ISBN-7981-0160-5 "Guide for New Functions of Oracle 9i Database/Mission-Critical System" published by Showeisha, Feb. 12, 2002. pp. 224-225.

* cited by examiner

*Primary Examiner*—Jean M Corrielus
*Assistant Examiner*—Angelica Ruiz
(74) *Attorney, Agent, or Firm*—Mattingly, Stanger, Malur & Brundidge, PC

(57) ABSTRACT

To provide a database which has plural log storage areas, and eliminates the sort in the restoration process by means of the application of logs, thereby carrying out the restoration quickly. A management server allocates DB servers to a corresponding one of plural data storage areas so as to access the corresponding one. The DB servers store data to the allocated data storage areas. When the data is referenced or updated, a log representing a data change history is stored in preset log areas for each data server. When the management server transmits a notification to change the data storage areas, area remapping logs are stored in log areas.

20 Claims, 25 Drawing Sheets

METHOD FOR MANAGING A DATABASE SYSTEM

CLAIM OF PRIORITY

The present application claims priority from Japanese application JP 2005-086572 filed on Mar. 24, 2005, the content of which is hereby incorporated by reference into this application.

BACKGROUND

This invention relates to a change of a configuration of a database and a recovery from a failure of the database, and more particularly to a configuration change and a restoration process for a shared-nothing type database.

As a result of a recent advent of inexpensive blade type computers, there is required a new operation form which configures a server computer (referred to as a blade server hereinafter) by combining plural blade type computers, and carries out processing by employing necessary computer resources within the blade server according to a load variation in the system. For realizing such an operation form, there is required a high-speed mechanism to change the system configuration for infrastructure software typified by database systems, application servers, and Web servers (referred to as middleware hereinafter). Moreover, the system employing the blade type computers has a large number of them in the server, and high scalability is required for the middleware.

A database management system (referred to as DBMS hereinafter), which is typical middleware, upon operating on the plural computers, is categorized into a shared-disk type where disk drives (storage systems) used to store data are shared by the computers, and a shared-nothing type where the respective computers use independent disk drives used to store data. On the shared-disk type DBMS, it is not necessary to care the allocation of data managed by the DBMS to the disk drives, and the system configuration is thus easily changed. However, it is necessary to provide exclusive access control for the computers which have access to a data storage area (referred to as data area hereinafter) on the shared disk, and the scalability is thus limited.

On the other hand, on the shared-nothing type DBMS, data areas are not shared, and the exclusive access control is thus not necessary for the computers, resulting in high scalability.

This type of the DBMS has to provide consistent data management, and thus records update histories (logs) of the data in log storage areas respectively managed by the computers in order to restore the data in case of any failures. For this purpose, a backup of the data areas is obtained at a certain time point, and logs are recorded from this time point. Upon a failure, the data areas are restored to the state at the failure by sequentially applying the stored logs to the backup. This process is referred to as restoration process.

Upon a known restoration process on the shared-nothing type DBMS, logs required for the restoration are obtained from the log storage areas of the respective computers, and these logs are then combined and sorted in the chronological order. The sorted logs are the applied to the backup to carry out the restoration process. (For example, US 2004-0030703 A and pp. 224 to 225 "Guide for New Functions of Oracle9i: Database/Mission Critical System" written by Takashi Kasahara, published by SHOEISHA, Feb. 12, 2002.)

SUMMARY

However, the conventional shared-nothing type DBMS once combines the logs from the respective computers, and then sorts the combined logs in the restoration process, it is necessary to prepare a temporary area for the combination and sort of the logs, and there is thus a difficult problem of securing a temporary area within the limited computer resources.

Moreover, since the conventional DBMS once combines the logs, and sorts the combined logs, and then applies the logs, the restoration process requires a large amount of time and the computer resources, and there is thus a problem of a long period required for a recovery from a disk failure or the like.

Further, on the shared-nothing type DBMS, it is possible to set plural data areas on shared storage systems, and to allocate the computers to the respective data areas. Upon a change in the configuration without accompanied additions/deletions of records, it is possible to carry out area remapping (remapping), which is a change in the configuration such as an addition/deletion of the computers by changing the allocation between the data areas and the computers. With this remapping, a high-speed change in the system configuration is realized. At the same time, the data areas on the shared storage systems are logically divided, and exclusive access control is thus not necessary among computers on which the DBMS is running, thereby increasing the scalability. However, on the shared-nothing type DBMS, the log storage areas are respectively provided for the computers, and as a result of the remapping, logs relating to one data area may be recorded in plural log storage areas. Consequently, upon the restoration process after the remapping, the logs must be combined while checking in the plural log storage areas, the process thus becomes complicated, the load on the restoration process increases, and the processing period required for the completion of the restoration is delayed.

This invention is devised in view of the foregoing problems, and provides a database which has plural log storage areas, and eliminates the sort in the restoration process by means of the application of logs, thereby carrying out the restoration quickly.

According to an embodiment of this invention, there is provided a database managing method used for a database in which a plurality of database servers have access to a plurality of data storage areas allocated by a management server, including the steps of: causing the management server to allocate the plurality of data storage areas to the plurality of database servers that have access to the data storage area to be allocated; causing the database server to store data to the allocated data storage area, and to refer to and update the stored data; causing the database server to store a log indicating an update history of the data in a log area set in advance to the respective database severs upon the update; and causing the database server to store an area remapping log indicating a change of the allocation of the data storage area in the log area upon receiving a notification of the change of the allocation of the data storage area from the management server.

The database managing method further includes the steps of causing the management server to instruct the database server to carry out a restoration process for a group of the logs stored in the log areas set respectively for the database servers, and separated by the area remapping logs as a unit, and causing the database server to apply the log stored in the log area to the data storage area according to the instruction to restore data, thereby restoring the data in the data storage areas.

According to this invention, if the allocation of the data storage areas to the database servers is updated, area remapping logs are respectively stored in the log areas in addition to the update history of the data. Upon the restoration process, it is possible to carry out the restoration while the plural database servers are synchronized by causing the respective database severs to apply the logs separated by the area remapping logs. As a result, it is not necessary to combine and then sort the logs as in the conventional case, resulting in a high-speed restoration.

DETAILED DESCRIPTION OF THE PREFERRED EMBODIMENTS

First Embodiment

An embodiment of this invention will now be described with reference to the accompanying drawings.

Figure 1:
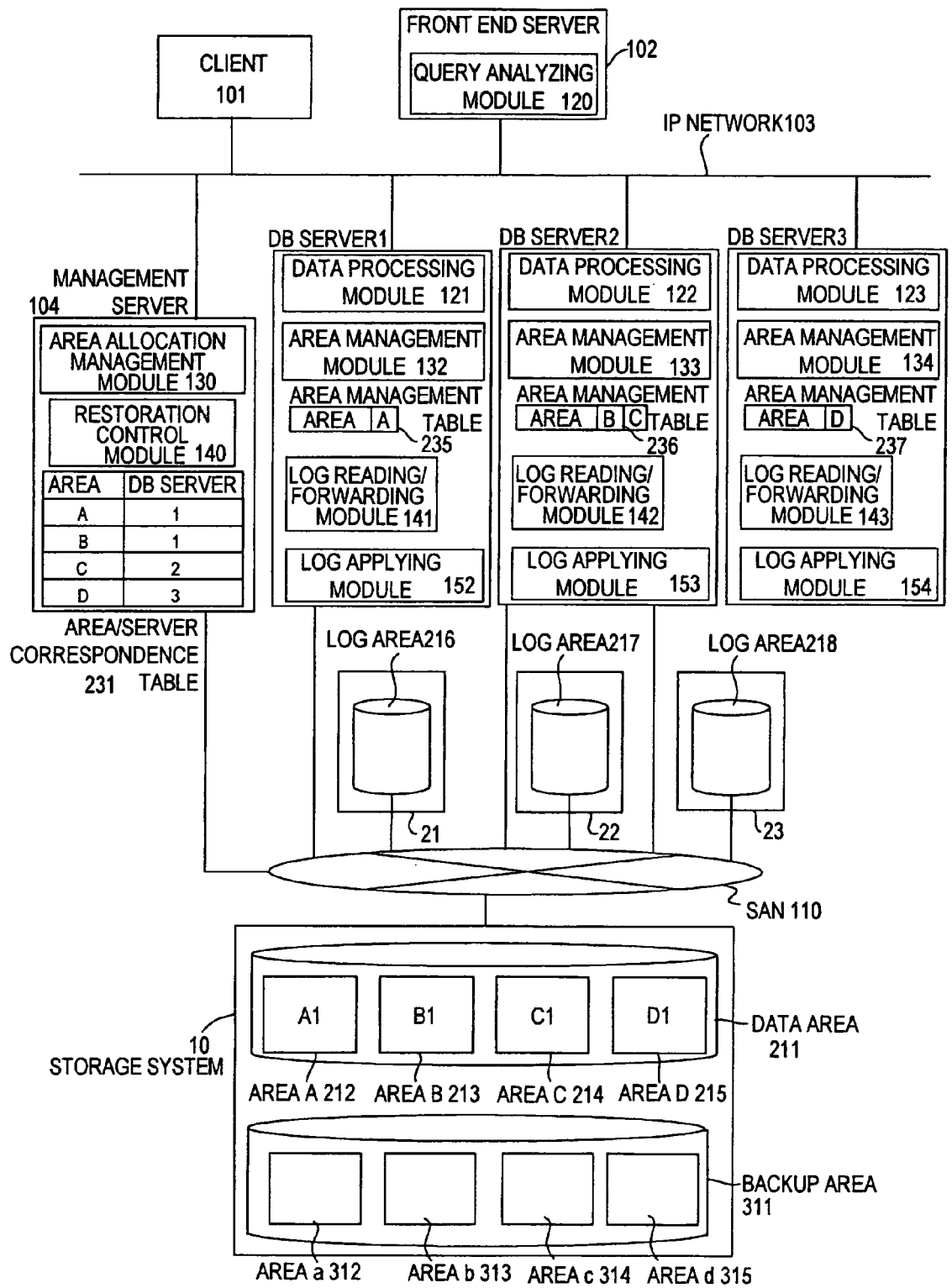
FIG. 1 is a diagram showing a configuration of a database system according to a first embodiment.

FIG. 1 is a block diagram showing a shared-nothing type database system according to the first embodiment of this invention.

A client computer (referred to as client hereinafter) 101, which carries out interactions with users (receives requests for processing, and returns results of the processing), is connected to a front end server computer (referred to as front end server hereinafter) 102 via an IP network 103, and the front end server 102 receives the requests for data processing from the client 101, and returns results thereof to the client 101.

The front end server 102 is connected to plural database servers (server computers which carry out database processing, and are referred to as DB servers hereinafter) 1 to 3 via the IP network 103, and requests the DB servers 1 to 3 for processing relating to the database processing (references to and updates of data) according to the requests from the client 101. In other words, the DB servers 1 to 3 function as back end servers. It should be noted that the front end server 102, the DB servers 1 to 3, and the client 101 are respectively provided with a CPU, a memory, and a network interface, which are not shown.

The plural DB servers 1 to 3 are connected to a storage system 10 via a SAN (Storage Area Network) 110, and respective DB servers 1 to 3 have access to independent data storage areas allocated by a management server 104 on the storage system 10, and carry out the data processing.

The storage system 10 includes a data area 211 which is accessible from the respective DB servers 1 to 3, and shared by the respective DB servers 1 to 3. In the data area 211 are set the data storage areas (referred to as areas hereinafter) A212 to D215, which are independent smaller areas. The respective areas A212 to D215 are not shared, and the DB servers 1 to 3 which are allocated by the management server 104 have access to them. The respective areas A 212 to D215 hold data of databases.

Moreover, on the storage system 10 is set a backup area 311 which stores a backup of the data area 211, and in the backup area 311 are set areas a312 to d315 used to store backup data of the respective areas A212 to D215 in the data area 211. The backup data are generated by a copy function of the storage system 10 or the like.

The management server 104 is connected to the DB servers 1 to 3 via the IP network 103, is connected to the storage system 10 via the SAN 110, and manages the areas A212 to D215 to be allocated to the respective DB servers 1 to 3. It should be noted that the management server 104 includes a CPU, a memory, and a network interface, which are not shown.

The respective DB servers 1 to 3 are connected to shared-nothing type storage systems 21 to 23 via the SAN 110, write logs, which are update histories of the data, in log areas 216 to 218 respectively set on the storage systems 21 to 23, and read the logs upon a restoration process. The respective log areas 216 to 218 are independently allocated to the DB servers 1 to 3, and the DB servers 1 to 3 exclusively possess the log areas 216 to 218 on the storage systems 21 to 23, respectively.

Although the management server 104 is an independent computer in FIG. 1, the management server 104 may be configured to be implemented by the computers serving as the front end server 102 and the DB servers 1 to 3. Moreover, the log areas 216 to 218 may be configured to be located on local disks of the respective DB servers 1 to 3, or on the storage system 10 shared by the respective DB servers 1 to 3. Further, the management server 104 can also refer to the log areas 216 to 218 via the SAN 110.

The client 101 issues a request to the front end server 102 for the data processing in an SQL format. In this embodiment, although the request to the DBMS is carried out by means of a query expressed in the SQL (Structured Query Language), other forms may be employed. Upon receiving the query, the front end server 102 creates an execution plan in a query analyzing module 120. The execution plan describes contents of processing carried out by data processing modules 121 to 123 respectively provided in the DB servers 1 to 3. The respective data processing modules 121 to 123 carry out the processing applied to the data areas A212 to D215 held by the DB servers 1 to 3.

The management server 104 includes an area allocation management module 130 which manages the areas A212 to D215 to be allocated to the DB servers 1 to 3, and an area/server correspondence table 231 which manages the allocation between the areas A212 to D215 in the storage system 10 and the DB servers 1 to 3, and manages the configuration of the shared-nothing type database system. The management server 104 includes a restoration control module 140 which applies the logs of the respective DB servers 1 to 3 in order to carry out the restoration process described later. It should be noted that the area/server correspondence table 231 is managed by the area allocation management module 130.

The area allocation management module 130 of the management server 104 provides a remapping function (area remapping function) which relocates areas without insertions and deletions of the data. The remapping function is similar to that disclosed in JP 2004-003601 A.

The data area 211 of the storage system 10 shared by the respective DB servers 1 to 3 are divided into the plural data storage areas (referred to as areas hereinafter). The single area is a unit possessed and accessed exclusively by a single DB server. In FIG. 1, the data area 211 is divided into four areas (areas A212, B213, C214, and D215).

The area/sever correspondence table 231 in FIG. 1 manages the correspondence between the four areas A212 to D215 and the DB servers 1 to 3. In the state shown in FIG. 1, the areas A212, B213, C214, and D215 are respectively allocated to the DB server 1, DB server 1, DB server 2, and DB server 3.

The DB server 1 includes the data processing module 121 which reads/updates the data in the areas A212 and B213 according to the requests from the front end server 102, an area management table 235 which manages the presently allocated areas A212 and B213 according to an allocation instruction from the area allocation management module 130 of the management server 104, and an area management module 132 which manages the destinations of the access of the data processing module 121 so that the access is made to the areas A212 and B213 set on the area management table 235. Moreover, upon updating the allocated areas A212 and B213, the data processing module 121 outputs logs to the log area 216 of the storage system 21.

The DB server 1 includes a log reading/forwarding module 141 which reads and forwards the logs from the log area 216 to restore data A1 to D1 in the data area 211 based upon the logs, and a log applying module 152 which applies the read logs to the backup data to restore the data. It should be noted that, similarly to the DB server 1, the DB servers 2 and 3 also include data processing modules 122 and 123, area management modules 133 and 134, area management tables 236 and 237, log reading/forwarding modules 142 and 143, and log applying modules 153 and 154.

In the example shown in FIG. 1, according to the setting on the area/server correspondence table 231 of the management server 104, on the area management table 235 of the DB server 1 are set the areas A212 and B213, and the DB server 1 has access to the areas A212 and B213 of the storage system 10. On the area management table 236 of the DB server 2 is set the area C214, and the DB server 2 has access only to the area C214. On the area management table 237 of the DB server 3 is set the area D215, and the DB server 3 has access only to the area D215.

Upon area remapping without deletions/insertions of records, the area allocation management module 130 of the management server 104 updates the area/server correspondence table 231, and instructs the area management modules 132 to 134 of the respective DB servers 1 to 3 to update the area management tables 235 to 237 held respectively to reflect the updated area/server correspondence table 231. The respective area management modules 132 to 134 of the DB servers 1 to 3 update the respective area management tables 235 to 237 according to the instruction. As a result of the update of the area management tables 235 to 237, the allocation of the areas A212 to D215 to which the respective DB servets 1 to 3 have access are updated. Consequently, it is possible to change the allocation (including additions and deletions) of the DB servers 1 to 3 having access to the areas A212 to D215 without physically moving data.

A description will now be given of a relationship between the area remapping and the logs.

Figure 2:
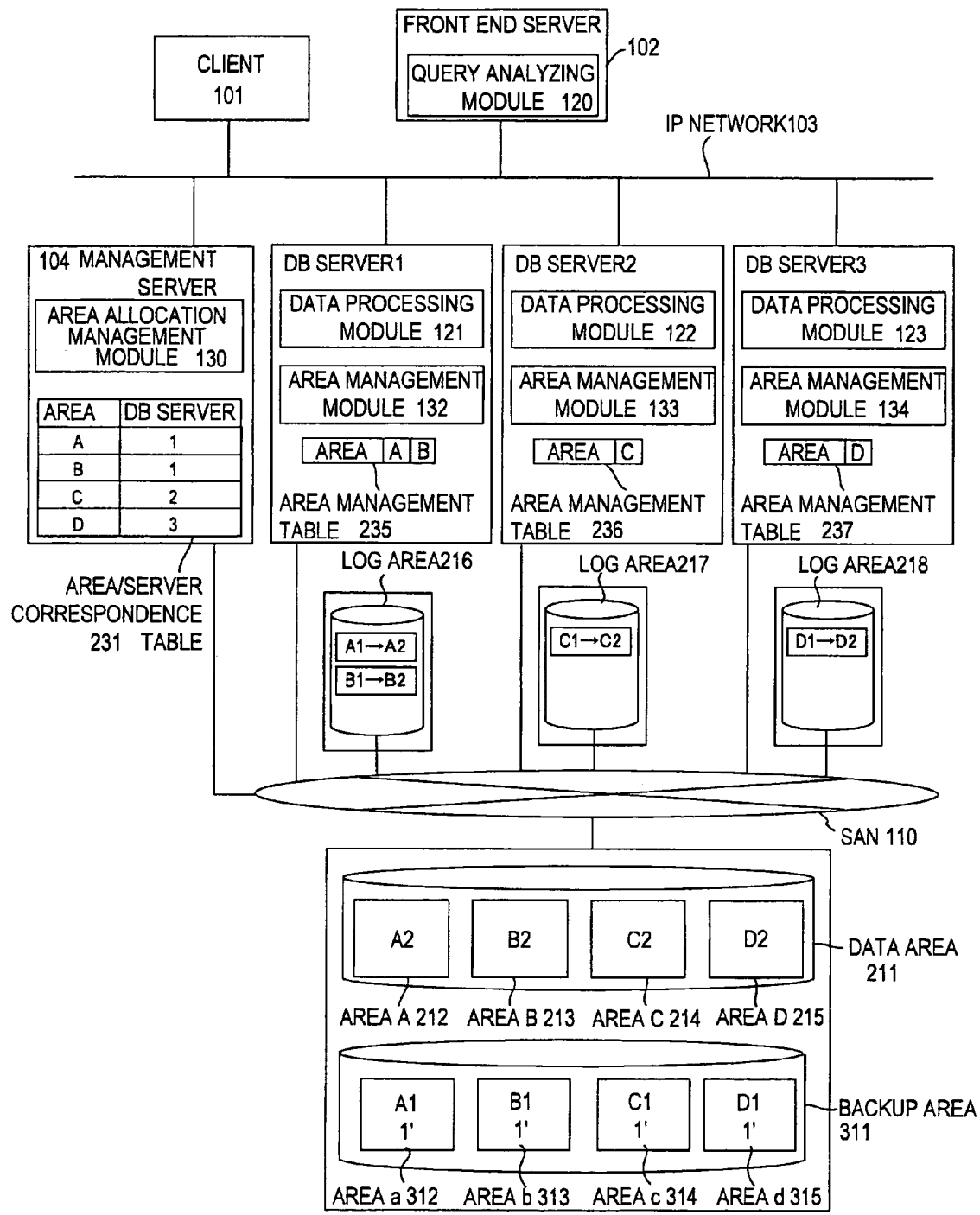
FIG. 2 is an explanatory diagram of a state of data and logs upon a backup being obtained.

FIG. 2 shows a state where the data A1 to D1 are updated in the respective areas A212 to D215 after the data area 211 is backed up. The storage system 10 carries out the backup by duplicating the areas A212 to D215 in the data area 211 to the areas a312 to d315 in the backup area 311. It should be noted that reference symbols A1' to D1' denote backup data generated immediately before the area remapping.

The data A1 to D1 are then updated in the respective areas A212 to D215. As a result of the update of the data A1 to D1, the respective DB servers 1 to 3 respectively store logs to the log areas 216 to 218. If the areas to store the data of the database are allocated as in the example shown in FIG. 1, as shown in FIG. 2, a log of an update history for the area A212 ("A1→A2" in FIG. 2) and a log for the area B213 ("B1→B2" in FIG. 2) are stored in the log area 216 of the DB server 1, a log for the area C214 ("C1→C2" in FIG. 2) is stored in the log area 217 of the DB server 2, and a log for the area D215 ("D1→D2" in FIG. 2) is stored in the log area 218 of the DB server 3.

Figure 3:
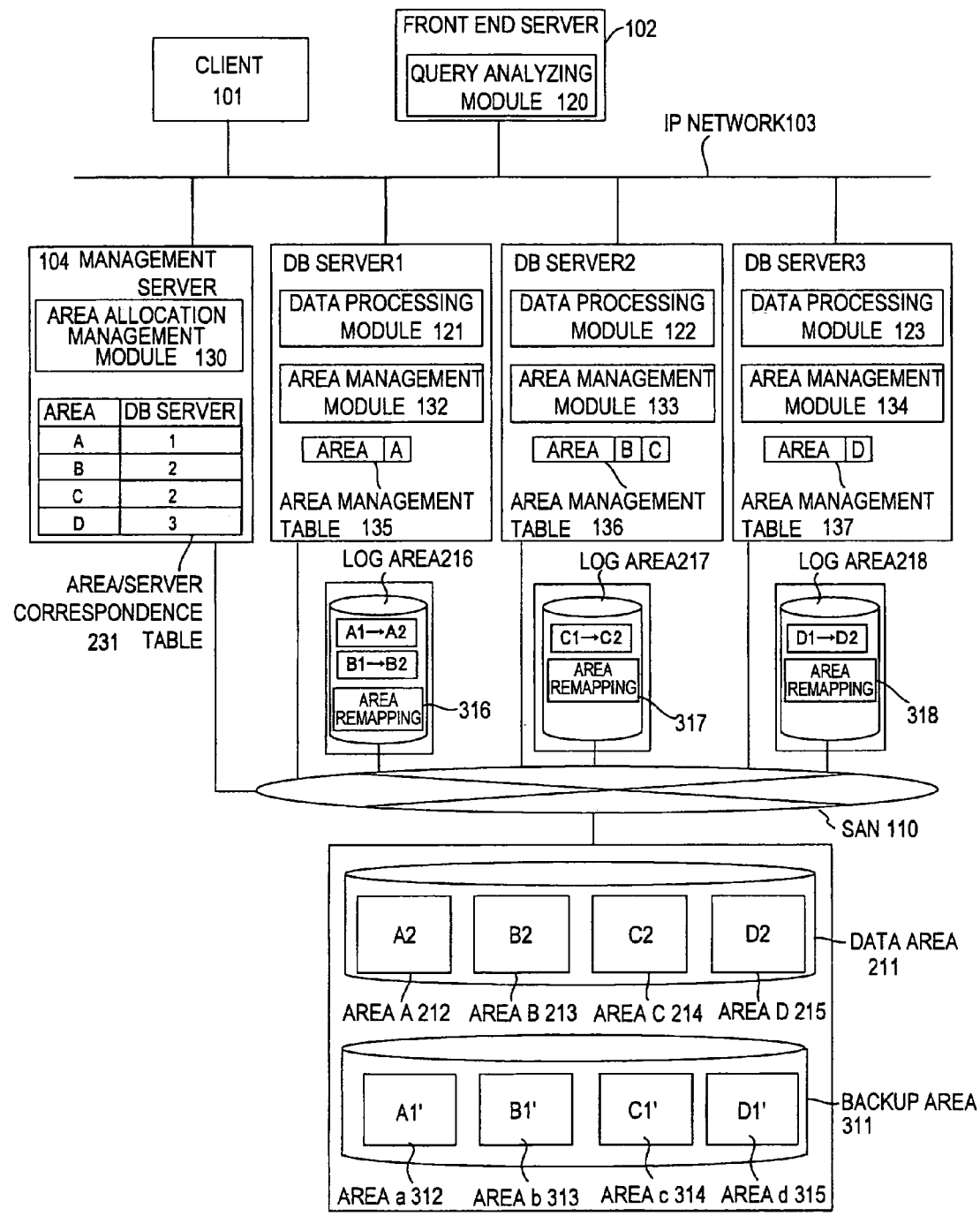
FIG. 3 is an explanatory diagram of a state of the data upon area remapping.

FIG. 3 shows a state immediately after the area remapping carried out subsequently to the state shown in FIG. 2.

As the instruction of the area remapping in this embodiment, there is described a case where the DB servers 1 and 2 are given an instruction from the management server 104 to change the DB server of the area B213 from the DB server 1 to the DB server 2. The area allocation management module 130 of the management server 104 updates the area/server correspondence table 231 to allocate the DB server 2 to the area B213. Then, notifications of the area remapping are respectively transmitted to the DB servers 1 and 2 and the storage system 10.

As a result of the notifications, the area management modules 132 to 134 of the DB servers 1 to 3 respectively update the area management tables 135 to 137, and output logs (area remapping logs 316 to 318) indicating the area remapping to the respective log areas 216 to 218. As a result, the DB server 1, the DB server 2, and the DB server 3 have exclusive access respectively to the area A212, the areas B213 and C214, and the area D215. The log areas 216 to 218 respectively show the states where the area remapping logs 316 to 318 are added.

Figure 4:
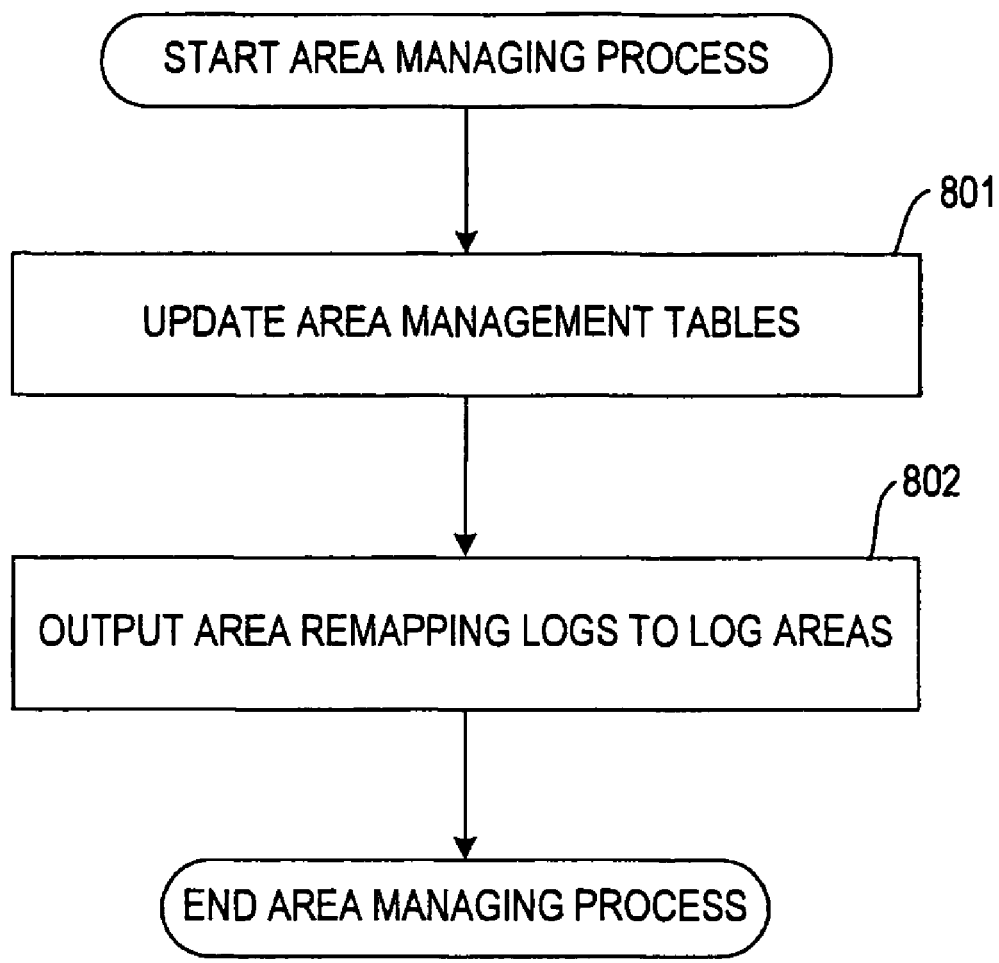
FIG. 4 is a flowchart showing an example of processing carried out by area management modules of respective DB servers.

FIG. 4 shows a flowchart for the area managing process for the data area remapping carried out by the respective area management modules 132 to 134 of the DB servers 1 to 3.

During the area remapping, upon updating the area management tables 235 to 237 of the respective DB servers 1 to 3, the area management modules 132 to 134 respectively output the area remapping logs 316 to 318, which are the logs indicating the area remapping, to the log areas 216 to 218. Upon respectively receiving the instructions from the area allocation management module 130 of the management server 104, the area management modules 132 to 134 respectively update the area management tables 235 to 237 (801). The area management modules 132 to 134 then respectively output the area remapping logs 316 to 318 to the log areas 216 to 218 (802).

As a result, upon the area remapping, the area remapping logs 316 to 318 are respectively output to the log areas 216 to 218 of all the DB servers 1 to 3. These area remapping logs 316 to 318 enable separation of the logs before and after the area remapping.

Figure 5:
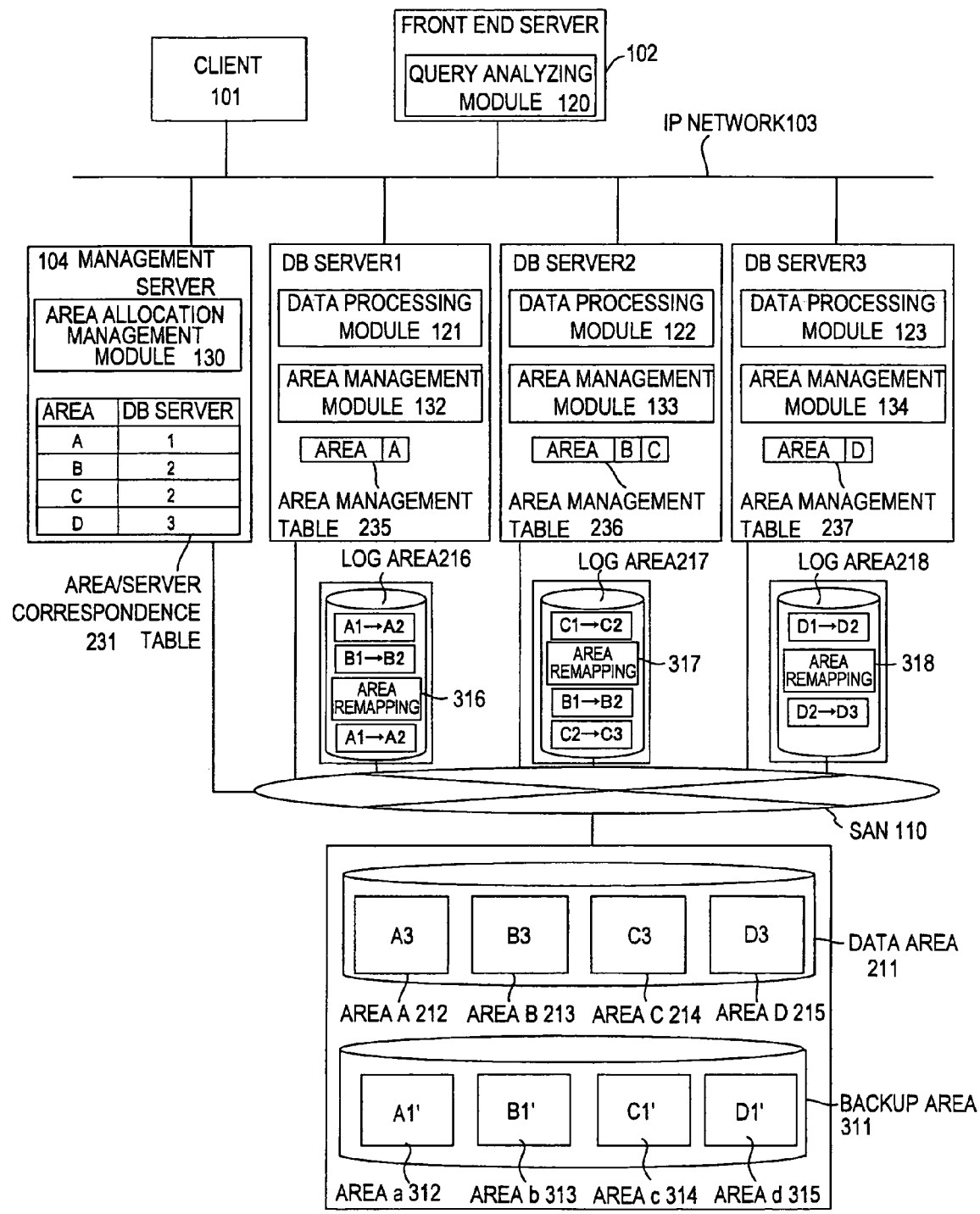
FIG. 5 is an explanatory diagram of a state of the data after the area remapping.

FIG. 5 shows a state after the data area 211 is updated subsequently to the state shown in FIG. 3. Specifically, the areas A212, B213, C214, and D215 are respectively updated to "A3", "B3", "C3", and "D3".

Since the area A212 is allocated to the DB server 1, the log for the area A212 is output to the log area 216. Since the areas B213 and C214 are allocated to the DB server 2, the logs for the area B213 and C214 are output to the log area 217. Since the area D215 is allocated to the DB server 3, the log for the area D215 is output to the log area 218.

Since the area remapping is carried out after the update of the data area in FIG. 2, although the log for the area B213 is output to the log area 216 of the DB server 1 in FIG. 2, after the area remapping in FIG. 3, the log for the area B213 is output to the log area 217 of the DB server 2. As a result, the logs of the area B213 are output to the different log areas as a result of the area remapping.

A description will now be given of the restoration process used to recover from a failure which occurs in the state shown in FIG. 5 after the area remapping shown in FIGS. 1 to 5.

In other words, the restoration process is to restore to the state in FIG. 5 using the backup data A1' to D1' obtained in the state in FIG. 2, and the logs for the two update processes and the area remapping carried out in FIGS. 2, 3, and 5.

Figure 6:
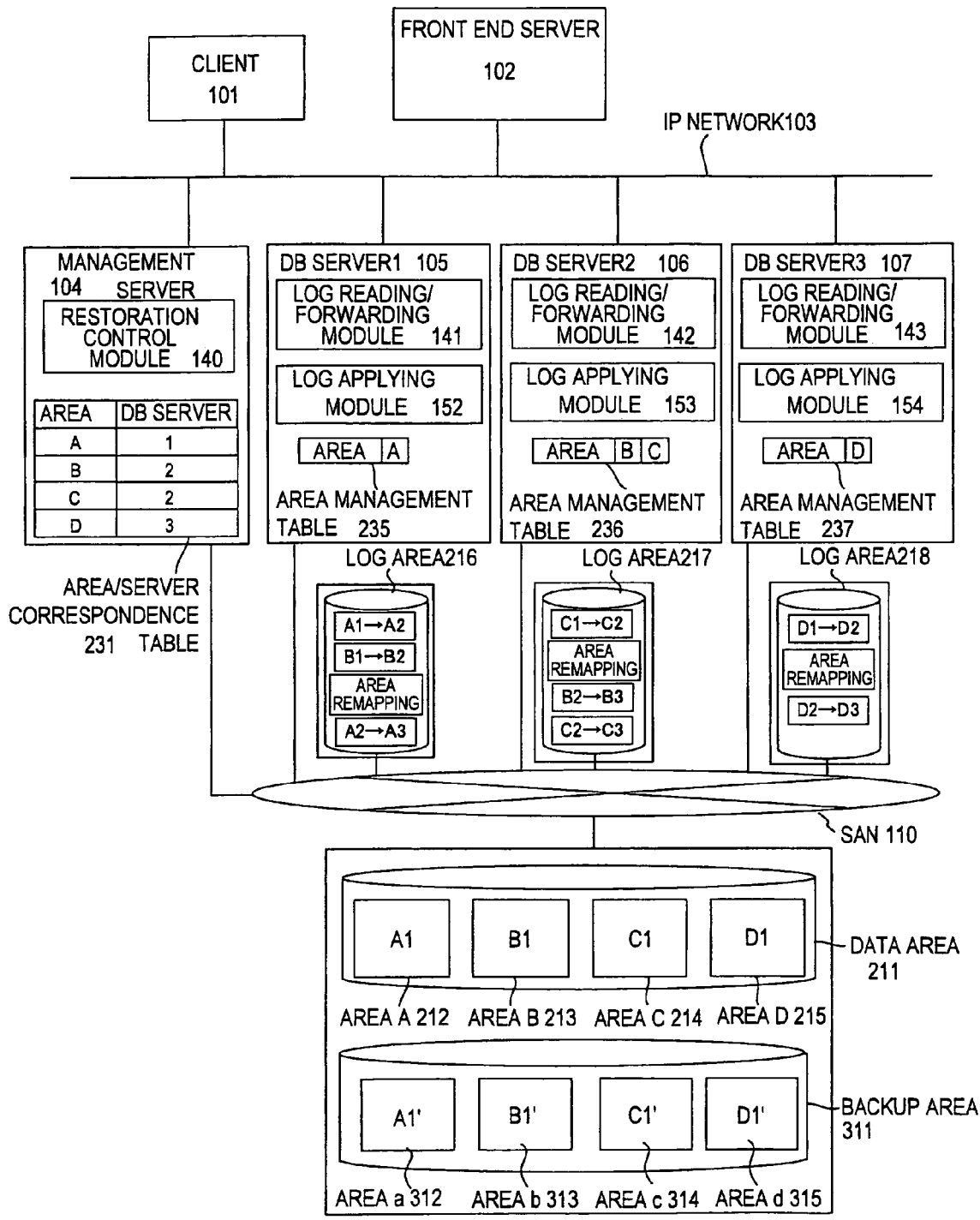
FIG. 6 is an explanatory diagram of a state of the data upon a start of a restoration process.

FIG. 6 shows a state where the data area 211 is restored to the state in FIG. 1 using the backup data A1' to D1' in FIG. 2.

The application of the logs is carried out by means of centralized log forwarding by the restoration control module 140 of the management server 104, the log reading/forwarding modules 141 to 143, and the log applying modules 152 to 154 of the respective DB servers 1 to 3. It should be noted that the restoration process is started upon the restoration control module 140 of the management server 104 transmitting instructions indicating the start of the restoration to the respective DB servers 1 to 3.

Figure 7:
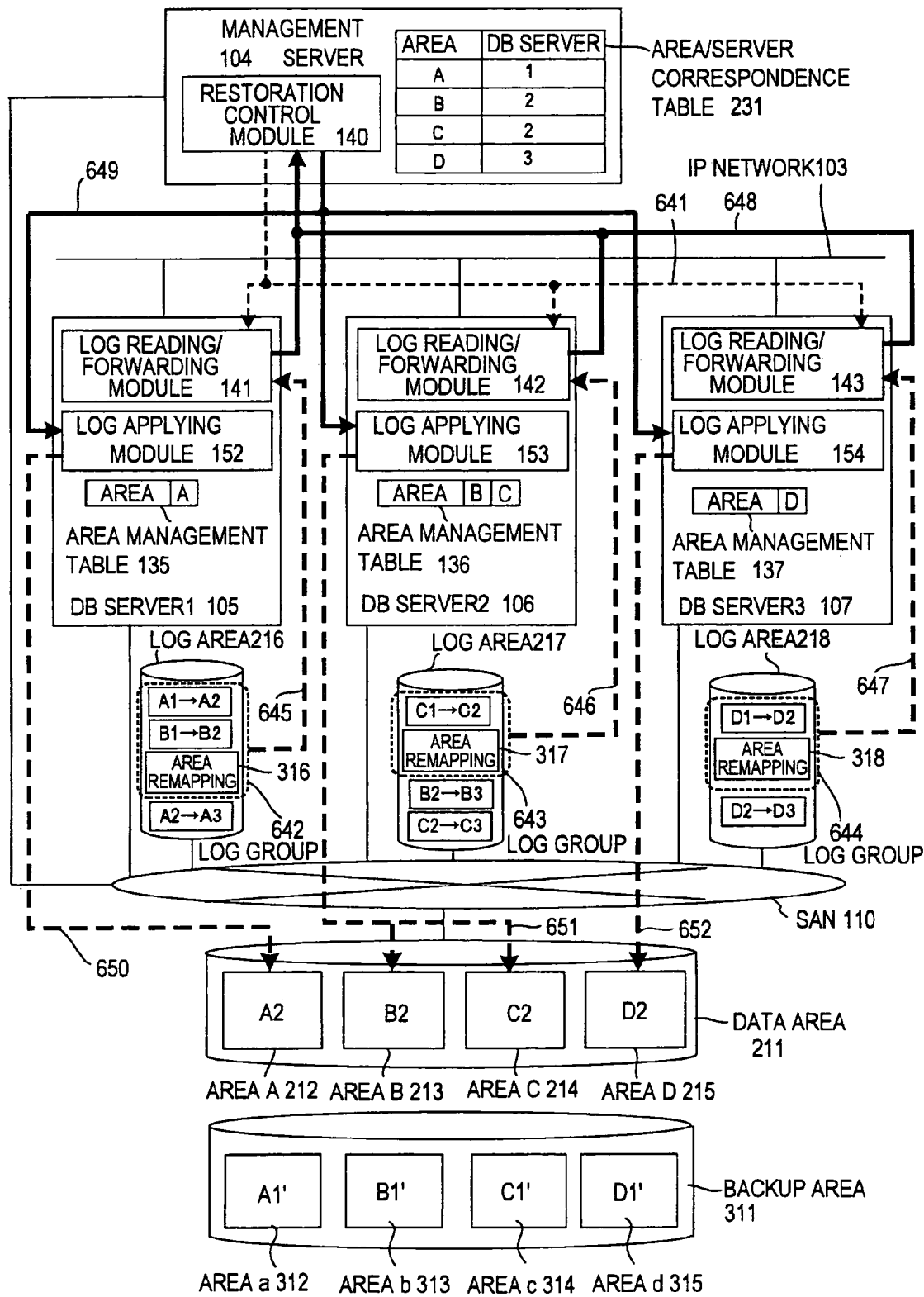
FIG. 7 is an explanatory diagram of a state of the data during the restoration process, and showing processing until the area remapping.

FIG. 7 shows a flow of data during the restoration process. If the respective DB servers 1 to 3 receive the instructions of the start of the restoration from the management server 104, the log reading/forwarding modules 141 to 143 respectively read the logs from the log areas 216 to 218 of the DB servers 1 to 3, and transmit the read logs to the restoration control module 140 of the management server 104 (641). It should be noted that upon respectively reading the area remapping logs 316 to 318, the log reading/forwarding modules 141 to 143 suspend the transmission of the logs until instructions of resumption (instructions of start) of the log transmission being received from the restoration control module 140 after the transmission of the area remapping logs 316 to 318.

The restoration control module 140 properly gives the start instructions to the log reading/forwarding modules 141 to 143 to cause them to respectively transmit the logs as log groups 642 to 644, which are respectively separated by the area remapping logs 316 to 318, from the DB servers 1 to 3, and refers to the area/server correspondence table 231 to forward the received logs to the respective log applying modules 152 to 154 of the proper DB servers 1 to 3 which presently hold the data areas described in the logs. The log applying modules 152 to 154 of the DB servers 1 to 3 respectively apply the received logs to the backup data A1' to D1' of the areas allocated to the DB servers 1 to 3 to restore them to the data A3 to D3.

The restoration control module 140 first gives the start instructions to the respective log reading/forwarding modules 141 to 143 (641). The log reading/forwarding modules 141 to 143 respectively read the log groups 642 to 644 until reading the area remapping logs 316 to 318 (645), and transmits the log groups 642 to 644 to the restoration control module 140 (648). The respective log reading/forwarding modules 141 to 143 carry out the processing in parallel, and suspend the reading and forwarding upon the transmission of the area remapping logs 316 to 318 to the restoration control module 140.

The restoration control module 140 refers to the area/server correspondence table 231 to transmit the logs to the log applying modules 152 to 154 of the proper DB servers 1 to 3 holding the areas described in the logs transmitted from the log reading/forwarding modules 141 to 143 (649).

Upon receiving the logs transmitted from the restoration control module 140, the log applying modules 152 to 154 respectively apply the logs to the backup data A1' to D1', and write the restored data A2 to D2 to the areas A212 to D215 (650 to 652).

On this occasion, the DB servers 1 to 3 which carry out writing to the respective areas A212 to D215 are determined based upon the area/server correspondence table 231 set to the state at the start of the restoration. In other words, in the example in FIG. 7, the log applying module 152 of the DB server 1 restores the area A212 (650), the log applying module 153 of the DB server 2 restores the areas B213 and C214 (651), and the log applying module 154 of the DB server 3 restores the area D215 (652).

On this occasion, the log reading/forwarding modules 141 to 143 are suspended until the resumption instructions being issued from the restoration control module 140, and the respective log applying modules 152 to 154 have applied the logs prior to the area remapping logs 316 to 318 (642 to 644).

In other words, the logs "A1→A2", "B1→B2", "C1→C2", and "D1→D2" are applied to the backup data A1' to D1', and consequently the data in the respective areas A212 to D215 have been restored to A2 to D2.

Figure 8:
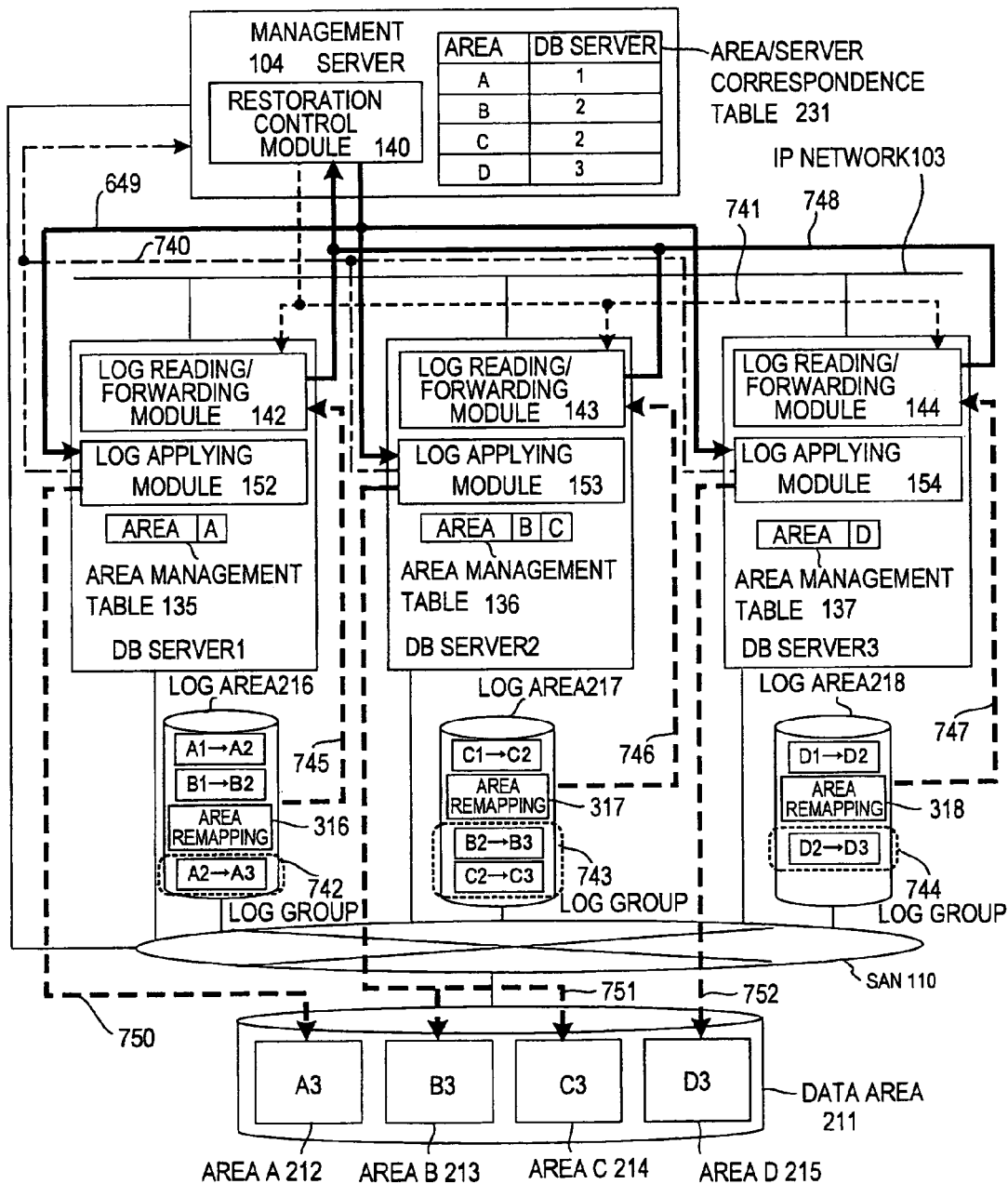
FIG. 8 is an explanatory diagram of a state of the data during the restoration process, and showing processing after the area remapping.

Then, in order to apply the logs subsequent to the area remapping logs 316 to 318, as shown in FIG. 8, the restoration control module 140 issues the resumption instructions to the respective log reading/forwarding modules 141 to 143 of the DB servers 1 to 3 (741). It should be noted that upon the completion of the application of the log groups 642 to 644, the log applying modules 152 to 154 may respectively transmit completion notifications to the restoration control module 140 (740), the restoration control module 140 may determine that the application of the logs are synchronized at the area remapping logs 316 to 318 in all the log applying modules 152 to 154, and the restoration control module 140 then may transmit the resumption instruction.

The log reading/forwarding modules 141 to 143 respectively read log groups 742 to 743 following the area remapping logs 316 to 318 from the log areas 216 to 218 (745), and transmit the log groups 742 to 743 to the restoration control module 140 (748).

The restoration control module 140 refers to the area/server correspondence table 231 to transmit the logs to the log applying modules 152 to 154 of the proper DB servers holding the areas described in the logs transmitted from the log reading/forwarding modules 141 to 143 (749) as described above. After the transmission of the log groups 742 to 744, the restoration control module 140 receives completion logs 740 from the respective log reading/forwarding modules 141 to 143, and completes the processing thereof. Upon receiving logs transmitted from the restoration control module 140, the log applying modules 152 to 154 respectively apply the log groups subsequent to the area remapping logs 316 to 318 to the respective areas A212 to D215 in the data area 211 (750 to 752). The restoration process is completed upon the completion of the operation above, and the respective areas A212 to D215 in the data area 211 are restored to the states A3 to D3, which is the state before the failure.

With reference to FIGS. 7 and 8, a description will now be given of the operations of the DB servers 1 and 2.

Upon receiving the start instructions of the restoration process from the restoration control module 140 of the management server 104, the log reading/forwarding module 141 of the DB server 1 reads the logs "A1→A2" and "B1→B2" from the log area 216, and forwards those read logs to the restoration control module 140 of the management server 104 (645 and 648). Upon having read the logs up to the area remapping log 316 from the log area 216, and having transmitted the read logs to the restoration control module 140, the log reading/forwarding module 141 suspends the log reading/forwarding until the resumption instruction.

Upon reading the log "A1→A2" forwarded from the log reading/forwarding module 141 of the DB server 1, the restoration control module 140 of the management server 104 determines the data storage area described in this log, refers to the area/server correspondence table 231, determines that the DB server 1 is allocated to the determined area A212, and forwards the log "A1→A2" to the log applying module 152 of the determined DB server 1. The log applying module 152 then applies the log to the backup data A1' to restore the state of the area A212 to the A2.

Upon reading the log "B1→B2", the restoration control module 140 then determines the data storage area described in this log, refers to the area/server correspondence table 231, determines that the DB server 2 is allocated to the determined area B213, and forwards the log "B1→B2" to the log applying module 153 of the determined DB server 2. The log applying module 153 then applies the log to the backup data B1' to restore the state of the area B212 to the B2.

Although the log "B1→B2" is output as a log of the DB server 1 in the state shown in FIG. 2, the log "B1→B2" is forwarded to the BD server 2 which is allocated to the area B213 after the area remapping based upon the area/server correspondence table 231 set to the state at the start of the restoration process, thereby restoring the states of the data exclusively possessed by the respective DB servers 1 to 3.

Upon having read the area remapping logs 316 to 318, the log reading/forwarding modules 141 to 143 then temporarily suspend the transmission of the logs, and wait for the resumption instructions from the restoration control module 140. The restoration control module 140 waits for the synchronization of the respective log applying modules 152 to 154, transmits the resumption instructions, and causes the log reading/forwarding modules 141 to 143 to transmit the next logs.

Upon reading the logs up to the area remapping logs 316 to 318, the restoration control module 140 waits for the synchronization of the respective log applying modules 152 to 154, and repeats the processing to apply the next logs up to the end of the logs.

Figure 9:
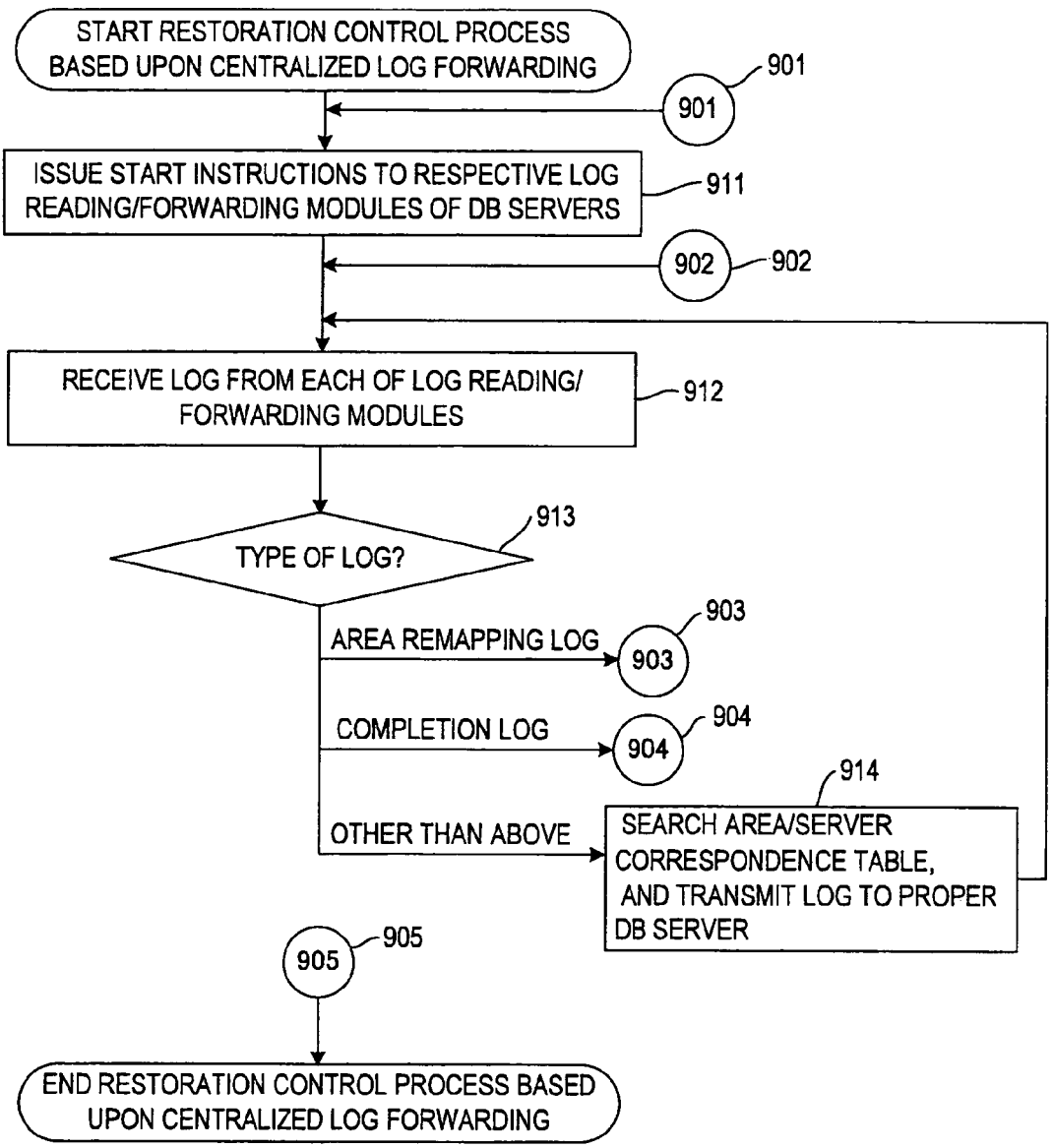
FIG. 9 is a flowchart showing an example of processing carried out by a restoration control module of a management server.
Figure 10:
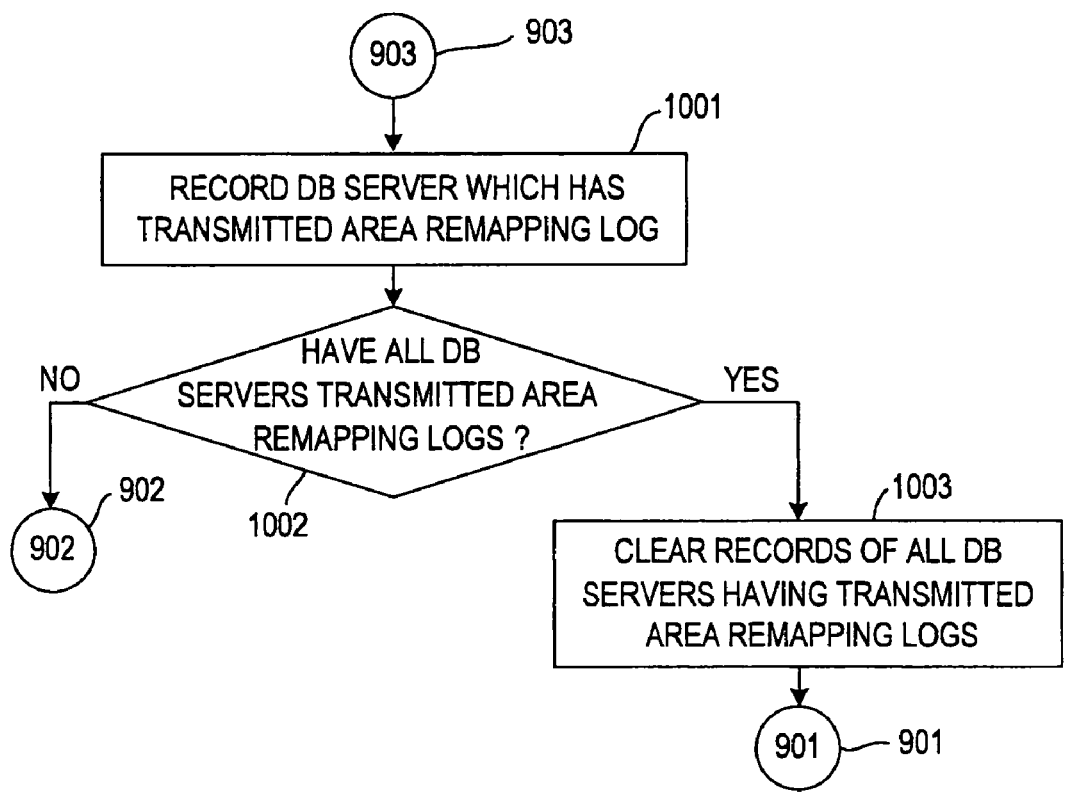
FIG. 10 is a flowchart showing an example of processing carried out by the restoration control module of the management server, which is determination of area remapping logs.
Figure 11:
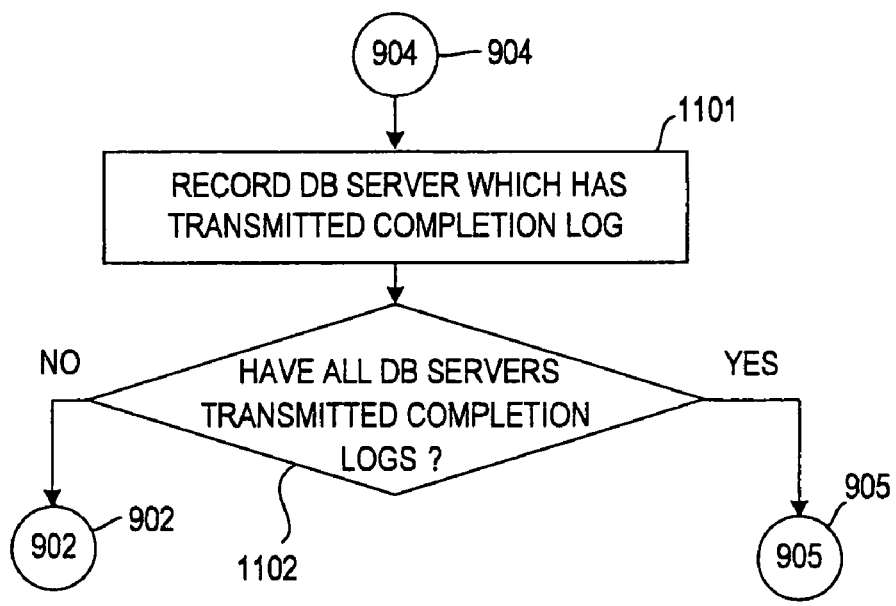
FIG. 11 is a flowchart showing another example of processing carried out by the restoration control module of the management server, which is determination of completion logs.

FIGS. 9 to 11 show a flow chart of the restoration control process by means of the centralized log forwarding in the restoration control module 140.

The restoration control module 140 first gives the start instructions to the respective log reading/forwarding modules 141 to 143 of the DB servers 1 to 3 (911). The restoration control module 140 receives a log transmitted from each of the log reading/forwarding modules 141 to 143 (912), and checks the type of the log (913). If the received log is an area remapping log, the restoration control module 140 proceeds to Connector 903. On the other hand, if the received log is a completion log, the restoration control module 140 proceeds to Connector 904.

If the received log is not an area remapping log or a completion log, the restoration control module 140 searches the area/server correspondence table 231 for an proper DB server which presently holding the area described in the log, and transmits the log to the log applying module of the searched DB server (914).

FIG. 10 shows processing subsequent to Connector 903. The restoration control module 140 records the DB server which has transmitted the area remapping log (1001). It should be noted that the DB server is recorded by means of a record to a memory, not shown, of the management server 104. As a preferable embodiment of the recording, a bit map corresponding to the DB servers 1 to 3 is provided, and bits respectively corresponding to the DB servers from which area remapping logs are received are set. As another preferable embodiment, the DB servers which have transmitted area remapping logs may be maintained as a list.

The restoration control module 140 then checks whether the area remapping logs 316 to 318 have been transmitted from all the DB servers 1 to 3 (1002). According to the method using the bit map, the restoration control module 140 checks whether the bits are set for all the DB servers 1 to 3. If the area remapping logs 316 to 318 have not been transmitted from all the DB servers 1 to 3, the restoration control module 140 proceeds to Connector 902. The restoration control module 140 returns to the step 912 subsequent to Connector 902, receives a log, and continues the process.

On the other hand, if the area remapping logs 316 to 318 have been transmitted from all the DB servers, the restoration control module 140 clears the records of all the DB servers (1003), and proceeds to Connector 901. The restoration control module 140 returns to the step 911 subsequent to Connector 901, and issues the resumption instructions (start instructions again) to the respective log reading/forwarding modules 141 to 143 of the DB servers 1. In the case where the restoration control module 140 determines to proceed to Connector 901, all the DB servers 1 to 3 have transmitted the area remapping logs 316 to 318, and all the log reading/forwarding modules 141 to 143 thus are respectively waiting for the resumption instructions from the restoration control module 140 operating based upon the centralized log forwarding.

FIG. 11 shows processing subsequent to Connector 904. The restoration control module 140 records the DB server which has transmitted the completion log (1101). The recording may be carried out in a similar manner as in the recording of the area remapping logs, and a further description will thus be omitted.

The restoration control module 140 then checks whether the completion logs have been transmitted from all the DB servers 1 to 3 (1102). If the completion logs have not been transmitted from all the DB servers 1 to 3, the restoration control module 140 proceeds to Connector 902. On the other hand, if the completion logs have been transmitted from all the DB servers 1 to 3, the restoration control module 140 proceeds to Connector 905. After Connector 905, the restoration control module 140 completes the restoration control process based upon the centralized log forwarding. In other words, all the DB servers 1 to 3 have completed the transmission of the logs, and the log applying process has thus been completed.

Figure 12:
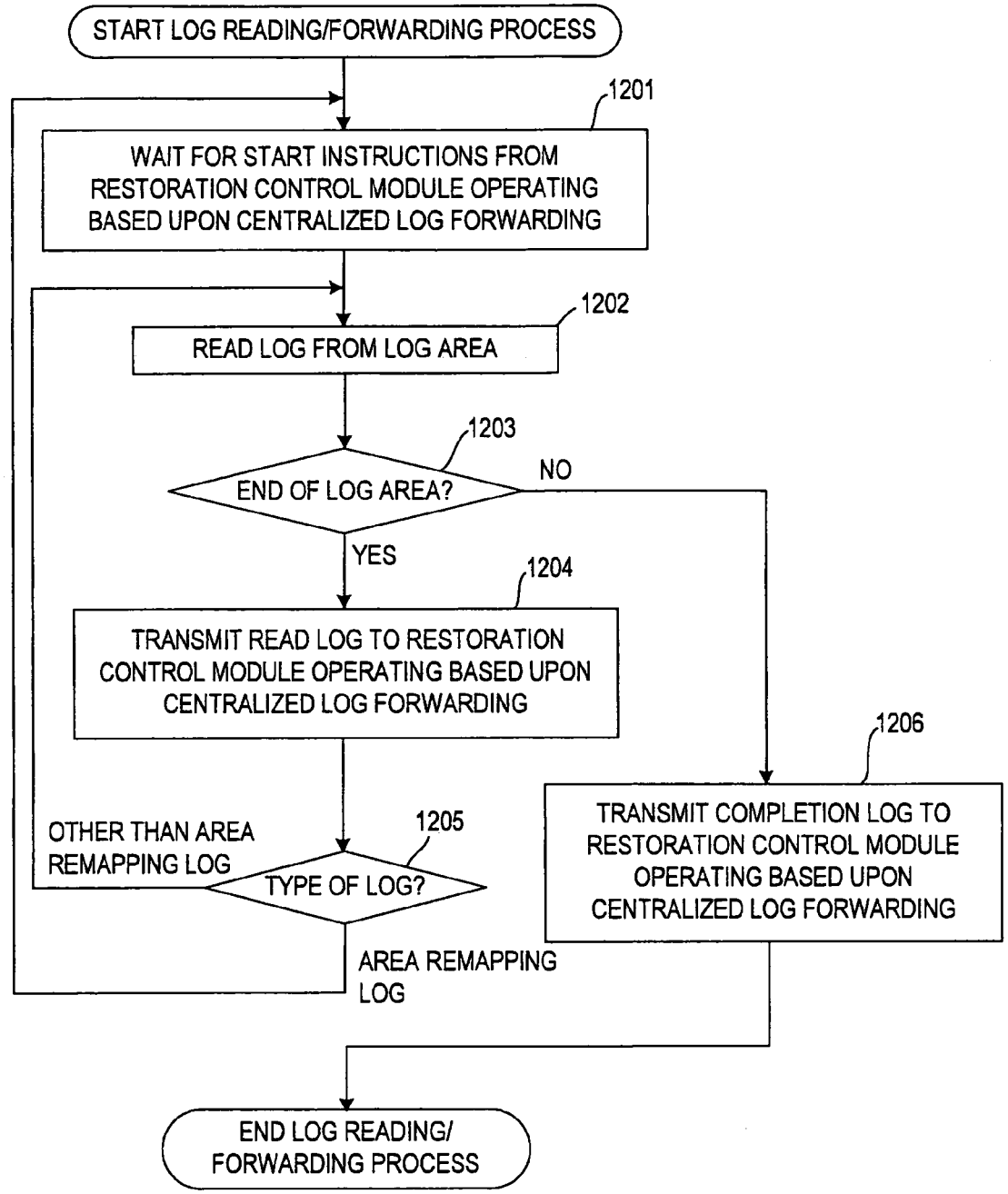
FIG. 12 is a flowchart showing an example of processing carried out by log reading/forwarding modules of the respective DB servers.

FIG. 12 shows a flowchart of the log reading/forwarding process respectively carried out by the log reading/forwarding modules 141 to 143 in the DB servers 1 to 3.

In FIG. 12, each of the log reading/forwarding modules 141 to 143 waits for the start instructions from the restoration control module 140 after the start of the log reading/forwarding process based upon the centralized log forwarding (1201). Upon receiving the start instruction, each of the log reading/forwarding module 141 to 143 reads the log from the corresponding one of the log area 216 to 218 (1202), and check whether the log has been read successfully (1203). If the reading failed, each of the log reading/forwarding modules 141 to 143 assumes that all the logs have been read, and transmits the completion log to the restoration control module 140 (1206).

On the other hand, if the reading was successful, each of the log reading/forwarding modules 141 to 143 transmits the read log to the restoration control module 140 (1204). Each of the log reading/forwarding module 141 to 143 determines whether the transmitted log is the corresponding one of the area remapping logs 316 to 318 (1205), returns to the step 1201 if the transmitted log is the area remapping log, and returns to the step 1202 if the transmitted log is not the area remapping log.

According to the above processing, the restoration control module 140 forwards the log transmitted from each of the DB servers 1 to 3 based upon the area/server correspondence table 231 set to the state at the start of the restoration, and synchronizes the respective log applying modules 152 to 154 by means of the area remapping logs 316 to 318 as boundaries. As a result, it is not necessary to combine and then sort the logs, which is required in the conventional case, resulting in a high-speed restoration process. Moreover, in the restoration process, the application of the logs requires only the resources of the computers used to construct the shared-nothing type database system, and does not require additional resources used to combine and then sort the logs, which are required in the conventional case. As a result, it is not necessary to prepare resources for the restoration process, resulting in a quick start of the restoration process.

Figure 29:
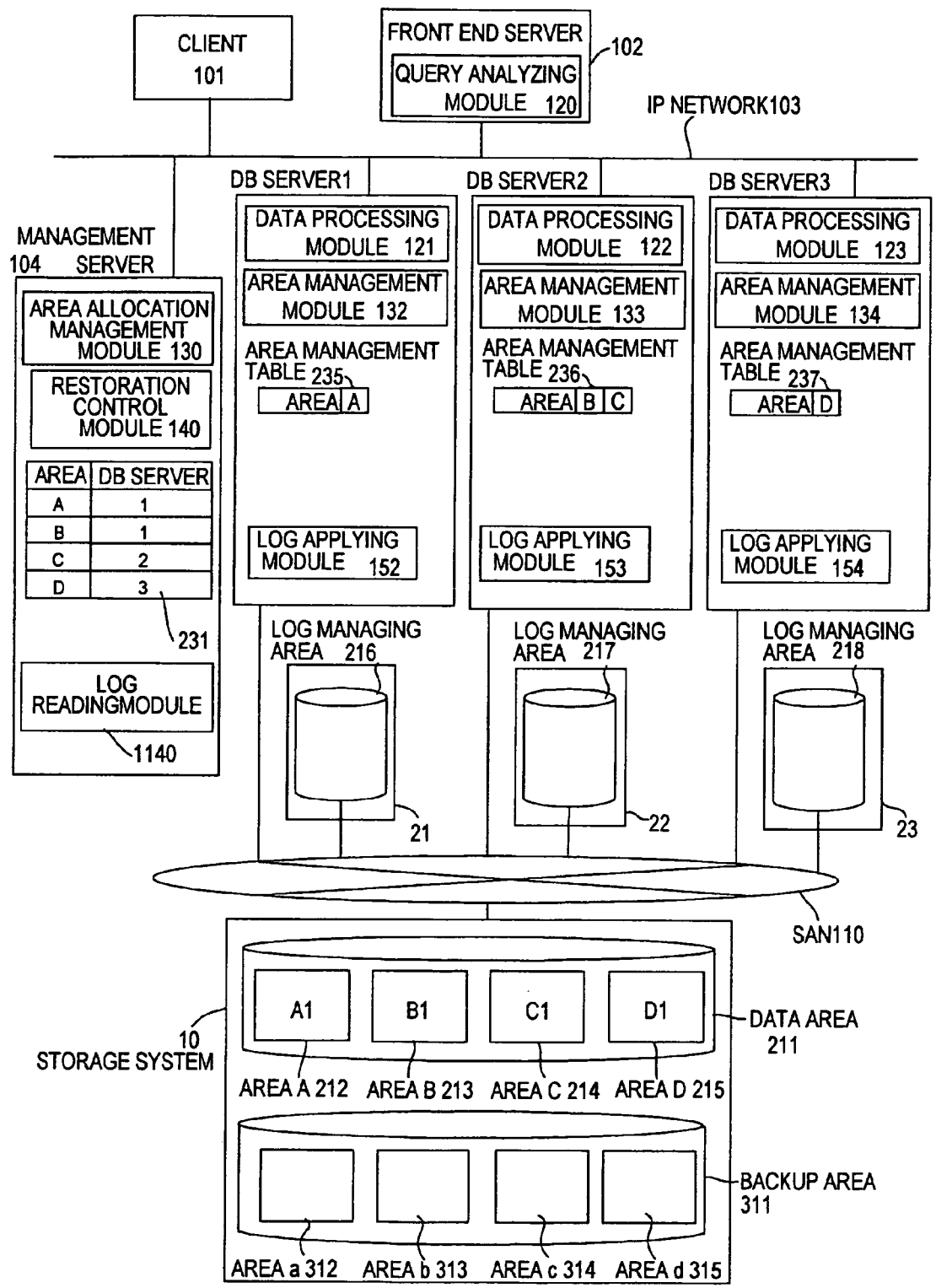
FIG. 29 is a diagram showing a configuration of a database system according to another example of the first embodiment.

Although the log reading/forwarding modules 141 to 143 of the DB servers 1 to 3 respectively read logs from the log areas 216 to 218, and then transmit the read logs, a log reading module 1140 may be provided in the management server 104 as shown in FIG. 29, and the restoration control module 140 may instructs the log reading module 1140 to read the logs of the respective DB servers 1 to 3. Moreover, if the log areas 216 to 218 are respectively provided on the local disks 21 to 23 of the DB servers 1 to 3, the logs may be read by causing the log reading module 1140 to copy the log areas 216 to 218 to the management server 104.

Although the area management modules 132 to 134 respectively output the area remapping logs in the first embodiment, the data processing modules 121 to 123 may respectively output the area remapping logs 316 to 318. In this case, the area management modules 132 to 134 respectively transmit instructions which respectively request the data processing modules 121 to 123 for the output of the area remapping logs 316 to 318.

Second Embodiment

Figure 13:
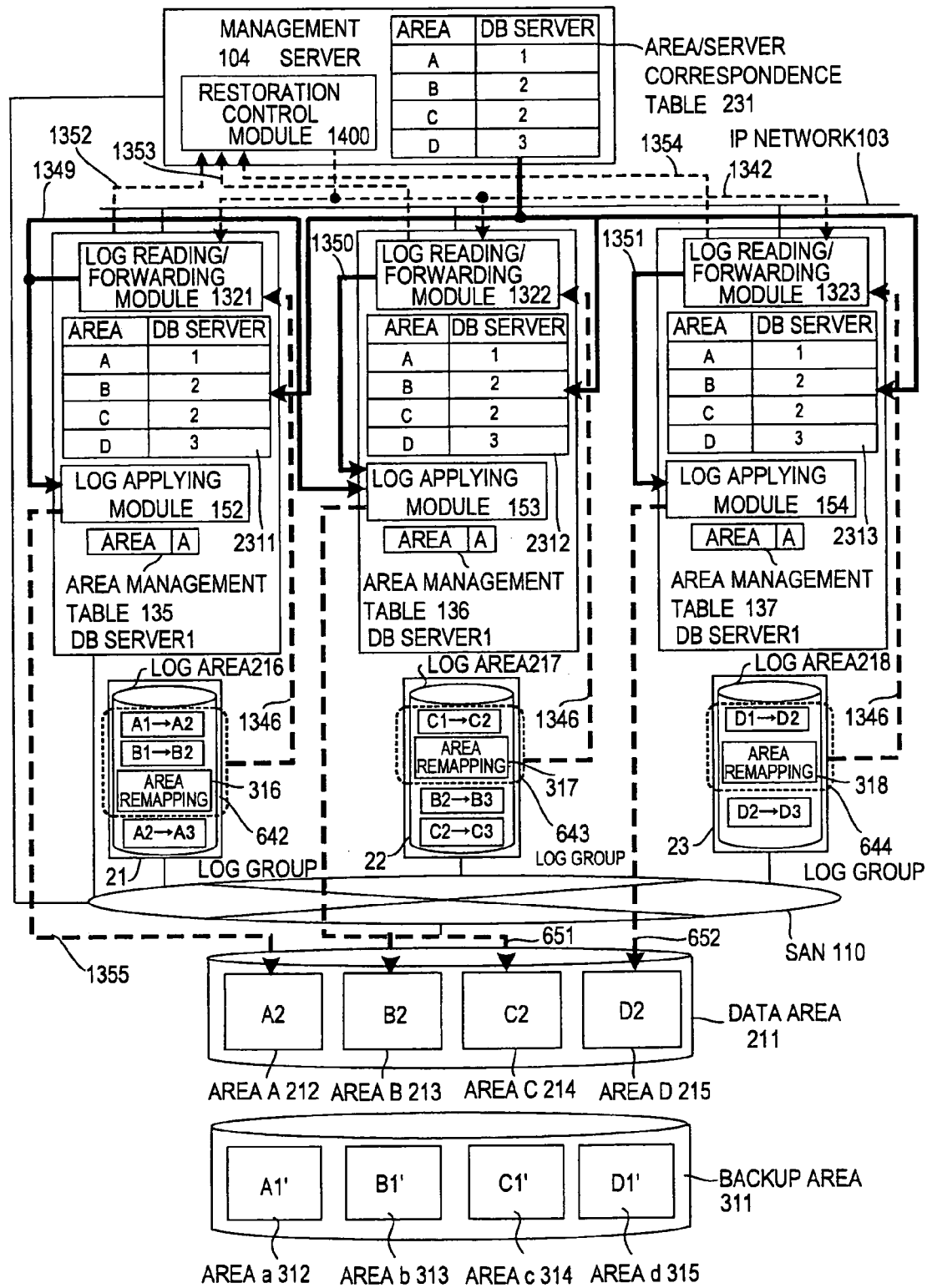
FIG. 13 is a diagram showing a configuration of a database system according to a second embodiment.

FIG. 13 is a block diagram showing an example of a non-shared type database system according to a second embodiment.

In the second embodiment, there are provided log reading/distributing modules 1321 to 1323 respectively in place of the log reading/forwarding modules 141 to 143 of the DB servers 1 to 3 according to the first embodiment, the area/server correspondence table 231 provided on the management server 104 is copied to the respective DB servers 1 to 3, the DB servers 1 to 3 read the logs from the log areas 216 to 218 and directly forward the logs to proper DB servers which presently hold the area described in the logs. The other configurations are the same as those of the first embodiment.

FIG. 13 shows the block diagram of the management server 104 and the DB servers 1 to 3, which carry out the restoration process. The management server 104 includes the area allocation management module 130 which is not shown in FIG. 13, but manages as in FIG. 1 the allocation of the respective areas A212 to D215 in the data area 211 to the DB servers 1 to 3. The DB servers 1 to 3 respectively include the area management modules 132 to 134 which manage the respective allocated areas A212 to D215 in the data area 211, and the data processing modules 121 to 123 which have access to the allocated data areas A212 to D215, and carry out the database processing, which are not shown in FIG. 13, but operate as in FIG. 1. Upon respectively receiving the instructions of the area remapping from the management server 104, as shown in FIG. 3, the area management modules 132 to 134 of the respective DB servers 1 to 3 output the area remapping logs 316 to 318 to the log areas 216 to 218.

The application of the logs is carried out based upon distributed log forwarding by a restoration control module 1400 of the management server 104 and the log reading/distributing modules 1321 to 1323 and the log applying modules 152 to 154 of the respective DB servers 1 to 3 in the restoration process.

The log reading/distributing modules 1321 to 1323 of the respective DB servers 1 to 3 respectively include area/server correspondence tables (log forwarding information storage modules) 2311 to 2313 which are copies of the area/server correspondence table 231 of the managing sever 104, read the logs from the log areas 216 to 218, search the area/server correspondence tables 2311 to 2313 for servers which presently possesses the respective areas described in the logs, and transmit the logs to the log applying modules 152 to 154 of the searched proper DB servers. Upon reading the area remapping logs 316 to 318, the log reading/distributing modules 1321 to 1323 suspend the transmission of the logs until the reception of the resumption instructions from the restoration control module 1400 operating based upon the distributed log forwarding. The restoration control module 1400 controls the restoration process while properly issuing the start instructions respectively to the log reading/distributing modules 1321 to 1323 of the DB servers 1 to 3.

Figure 14:
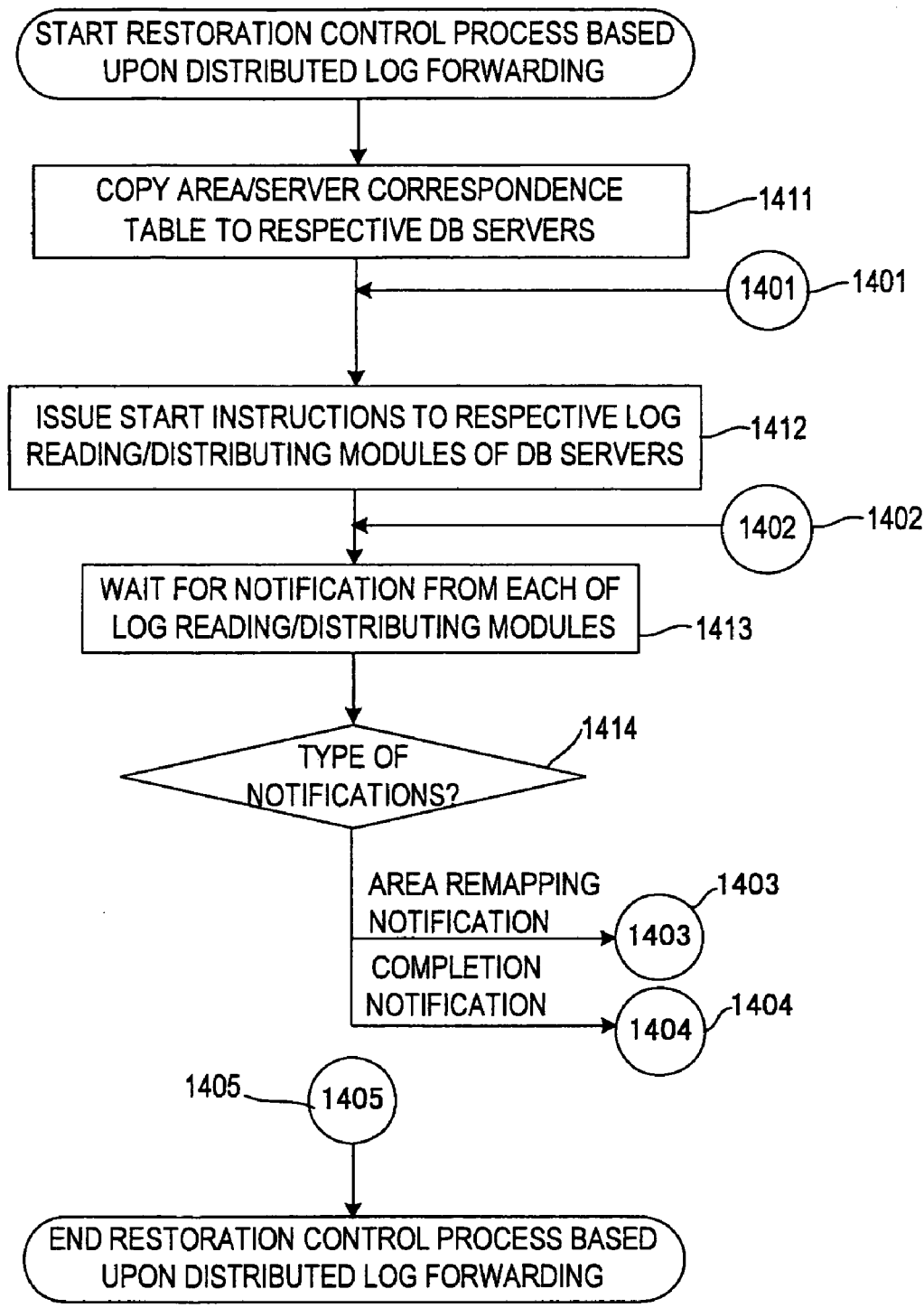
FIG. 14 is a flowchart showing an example of processing carried out by a restoration control module of a management server according to the second embodiment.
Figure 15:
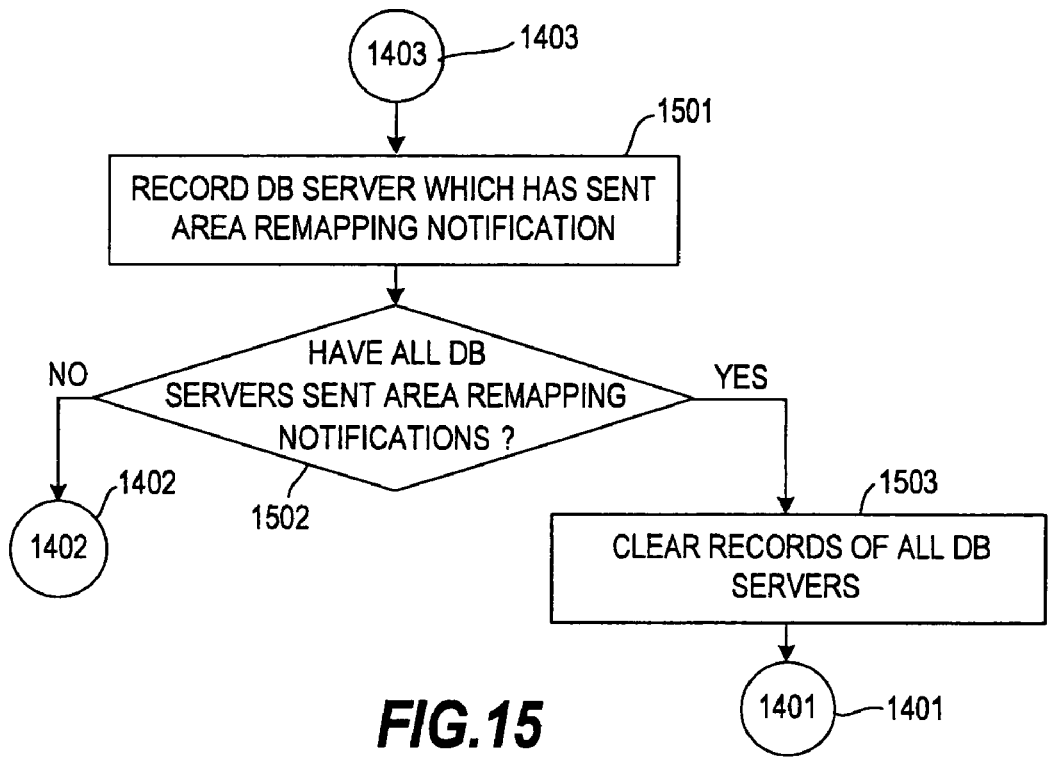
FIG. 15 is a flowchart showing another example of processing carried out by the restoration control module of the management server according to the second embodiment, which is determination of area remapping notifications.
Figure 16:
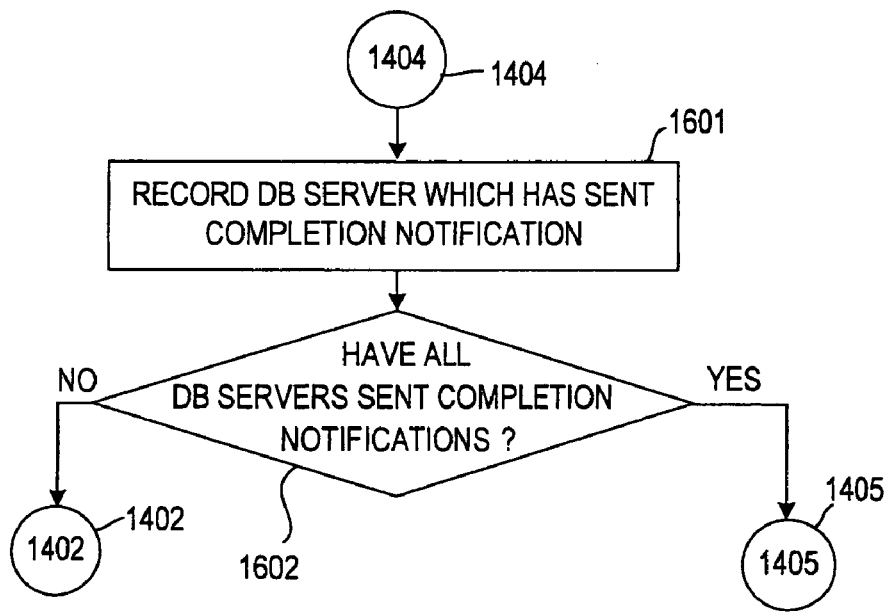
FIG. 16 is a flowchart showing still another example of processing carried out by the restoration control module of the management server according to the second embodiment, which is determination of completion notifications.

FIGS. 14 to 16 show a flowchart of the restoration process carried out by the restoration control module 1400 based upon the distributed log forwarding.

The restoration control module 1400 first copies the area/server correspondence table 231 to the respective DB servers 1 to 3, and respectively stores the area/server correspondence tables 2311 to 2313 to the log reading/distributing modules 1321 to 1323 of the DB servers 1 to 3 (1411). The restoration control module 1400 then issues the start instructions of the restoration process to the respective log reading/distributing modules 1321 to 1323 of the DB servers 1 to 3 (1412). The restoration control module 1400 receives a notification transmitted from each of the log reading/distributing modules 1321 to 1323 (1413), and checks the type of the notification (1414). If the received notification is an area remapping notification, the restoration control module 1400 proceeds to Connector 1403. On the other hand, if the received notification is a completion notification, the restoration control module 1400 proceeds to Connector 1404. It should be noted that the area remapping notification is transmitted to the restoration control module 1400 if each of the log reading/distributing modules 1321 to 1323 of the respective DB servers 1 to 3 reads the corresponding one of the area remapping logs 316 to 318, and the completion notification is transmitted to the restoration control module 1400 if each of the log reading/distributing modules 1321 to 1323 reads the logs up to the end of corresponding one of the log areas 216 to 218.

FIG. 15 shows processing subsequent to Connector 1403 in FIG. 14. The restoration control module 1400 records a DB server which has transmitted the area remapping notification (1501). The recording may be carried out as in the first embodiment. The restoration control module 1400 then checks whether the area remapping notifications have been transmitted from all the DB servers 1 to 3 (1502). If the area remapping notifications have not been transmitted from all the DB servers 1 to 3, the restoration control module 1400 proceeds to Connector 1402. The restoration control module 1400 returns to the step 1413 subsequent to Connector 1402, and continue to wait for the notifications. On the other hand, if the area remapping notifications have been transmitted from all the DB servers 1 to 3, the restoration control module 1400 clears the records of all the DB servers 1 to 3 (1503), and proceeds to Connector 1401. The restoration control module 1400 returns to the step 1412 subsequent to Connector 1401, and respectively issues the resumption instructions (start instructions again) to the log reading/distributing modules 1321 to 1323 of the DB servers 1 to 3. In the case where the restoration control module 1400 determines to proceed to Connector 1401, all the DB servers 1 to 3 have transmitted the area remapping notifications, and all the log reading/forwarding modules 1321 to 1323 thus are waiting for the resumption instructions from the restoration control module 1400 operating based upon the distributed log forwarding.

FIG. 16 shows processing subsequent to Connector 1404. The restoration control module 1400 records a DB server which has transmitted the completion notification (1601). The completion notification may be recorded as in the first embodiment as for the area remapping notification. The restoration control module 1400 then checks whether the completion notifications have been transmitted from all the DB servers 1 to 3 (1602). If the completion notifications have not been transmitted from all the DB servers 1 to 3, the restoration control module 1400 proceeds to Connector 1402. On the other hand, if the completion notifications have been transmitted from all the DB servers 1 to 3, the restoration control module 1400 proceeds to Connector 1405. The restoration control module 1400 completes the restoration control process after Connector 1405. In other words, all the log reading/distributing modules 1321 to 1323 have completed the reading of the logs, and the log applying process has thus been completed.

Figure 17:
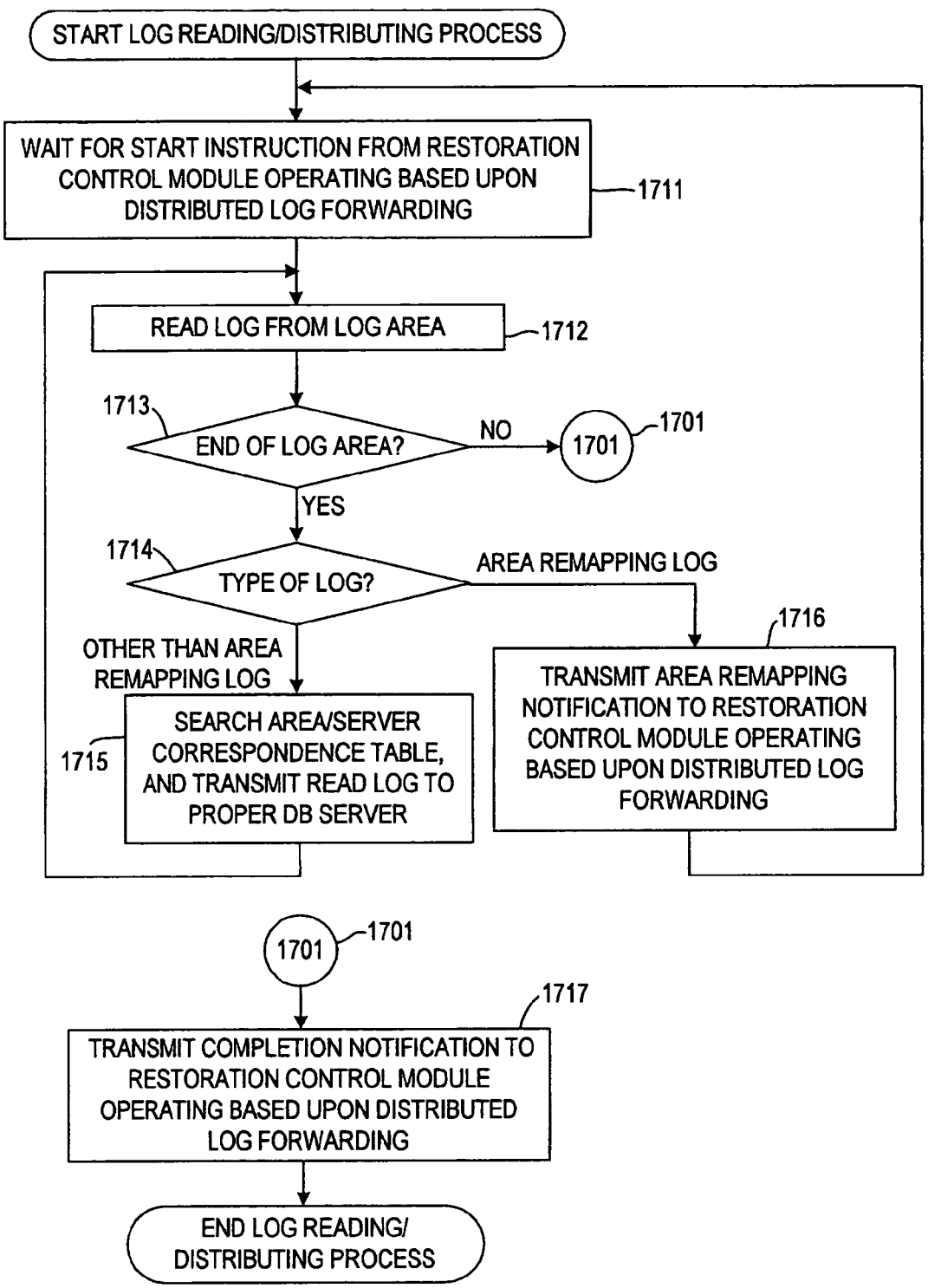
FIG. 17 is a flowchart showing an example of processing carried out by log reading/distributing modules of the respective DB servers according to the second embodiment.

FIG. 17 shows a flowchart of the log reading/distributing process carried out respectively by the log reading/distributing modules 1321 to 1323 of the respective DB servers 1 to 3.

Each of the log reading/distributing modules 1321 to 1323 waits for the start instruction from the restoration control module 1400 after the process based upon the distributed log forwarding starts (1711). Upon receiving the start instruction, each of the log reading/distributing modules 1321 to 1323 reads the log from the corresponding one of the log areas 216 to 218 (1712), and checks whether the log has been read successfully (1713). If the reading failed, each of the log reading/distributing modules 1321 to 1323 assumes that all logs have been read, and transmits the completion notification to the restoration control module 1400 (1717). On the other hand, if the reading was successful, each of the log reading/distributing modules 1321 to 1323 checks whether the read log is the corresponding one of the area remapping logs 316 to 318 (1714). If the read log is the corresponding one of the area remapping logs 316 to 318, each of the log reading/distributing modules 1321 to 1323 transmits the area remapping notification to the restoration control module 1400, and returns to the step 1711. On the other hand, if the read log is not the corresponding one of the area remapping logs 316 to 318, each of the log reading/distributing modules 1321 to 1323 searches the corresponding one of the area/server correspondence tables 2311 to 2313, transmits the read log to the log applying module 152 to 154 of a corresponding DB server exclusively possessing the area described in the read log (1715), and proceeds to the step 1712.

With reference to FIG. 13, a description will now be given of an overall flow of the above restoration process.

The restoration control module 1400 copies the area/server correspondence table 231 to the respective DB servers 1 to 3, and the respective log reading/distributing modules 1312 to 1323 of the DB servers 1 to 3 store the area/server correspondence tables 2311 to 2313 (1341).

The restoration control module 1400 respectively issues the start instructions of the restoration process to the log reading/distributing modules 1321 to 1323 (1342). The log reading/distributing modules 1321 to 1323 respectively continue to read the logs from the log areas 216 to 218 up to the area remapping logs 316 to 318, and transmit the read logs to the log applying modules 152 to 154 of the DB servers 1 to 3 corresponding to the areas described in the logs.

Upon reading the area remapping logs 316 to 318, the log reading/distributing modules 1321 to 1323 transmit the area remapping notifications to the restoration control module 1400 (1352, 1353, and 1354). The log reading/distributing modules 1321 to 1323 respectively read the logs up to the area remapping logs 316 to 318 as log groups 1343 to 1345 from the log areas 216 to 218 (1346).

On this occasion, the log reading/distributing module 1322 of the DB server 1 reads the log for the area A212 and the log for the area B213 stored in the log area 216, thus transmits the read log for the area A212 to the log applying module 152 to apply the transmitted log, and the read log for the area B213 to the log applying module 153 of the DB server 2 based upon the area/server correspondence table 2311.

The log reading/distributing module 1322 of the DB server 2 reads the log up to the area remapping log 317 as the log group 1344 from the log area 217 (1347). The log reading/distributing module 1322 reads the log for the area C214, and thus transmits the read log for the area C214 to the log applying module 153 (1350).

The log applying module 153 of the DB server 2 also reads the log for the area B213 received from the log reading/distributing module 1321 of the DB server 1 (1349).

The log reading/distributing module 1323 of the DB server 3 reads the log up to the area remapping log 317 as the log group 1345 from the log area 218 (1348). The log reading/distributing module 1323 read the log for the area D215, and thus transmits the read log for the area D215 to the log applying module 154 (1351).

The processing by the respective log reading/distributing modules 1321 to 1323 is carried out in parallel. The log applying modules 152 to 154 respectively apply the logs, and restore the areas A212 to D215 in the data area 211 (1355 to 1357). On this occasion, the log reading/forwarding modules 1321 to 1323 are suspended until the resumption instructions from the restoration control module 1400, and the log applying modules 152 to 154 have respectively applied the logs prior to the area remapping logs 316 to 318.

Upon having received the area remapping notifications from the log reading/distributing modules 1321 to 1323 of all the DB servers 1 to 3, the restoration control module 1400 respectively issues the resumption instructions to the log reading/distributing modules 1321 to 1323.

The log reading/distributing modules 1321 to 1323 and the log applying modules 152 to 154 respectively read the logs following the area remapping logs 316 to 318 in the same manner as described above, forward the logs to the DB servers 1 to 3 based upon the area/server corresponding tables 2311 to 2313, and apply the logs corresponding to the own DB servers. Upon having read all the logs, the log reading/distributing modules 1321 to 1323 respectively transmit the completion notifications to the restoration control module 1400. Upon receiving the completion notifications, the restoration control module 1400 completes the restoration process. As a result of the above operation, the respective areas A212 to D215 have been restored.

According to the above processing, upon the restoration process, the log reading/distributing modules 1321 to 1323 of the DB servers 1 to 3 respectively forward the logs based upon the area/server correspondence tables 2311 to 2313 set to the state at the start of the restoration, and synchronize the respective log applying modules 152 to 154 by means of the area remapping logs 316 to 318 as boundaries. As a result, it is not necessary to combine and then sort the logs, which is required in the conventional case, resulting in a high-speed restoration process. Moreover, in the restoration process, the application of the logs requires only the resources of the computers constituting the shared-nothing type database system, and does not requires additional resources used to combine and then sort the logs, which are required in the conventional case. As a result, it is not necessary to prepare resources for the restoration process, resulting in a quick start of the restoration process.

Third Embodiment

Figure 18:
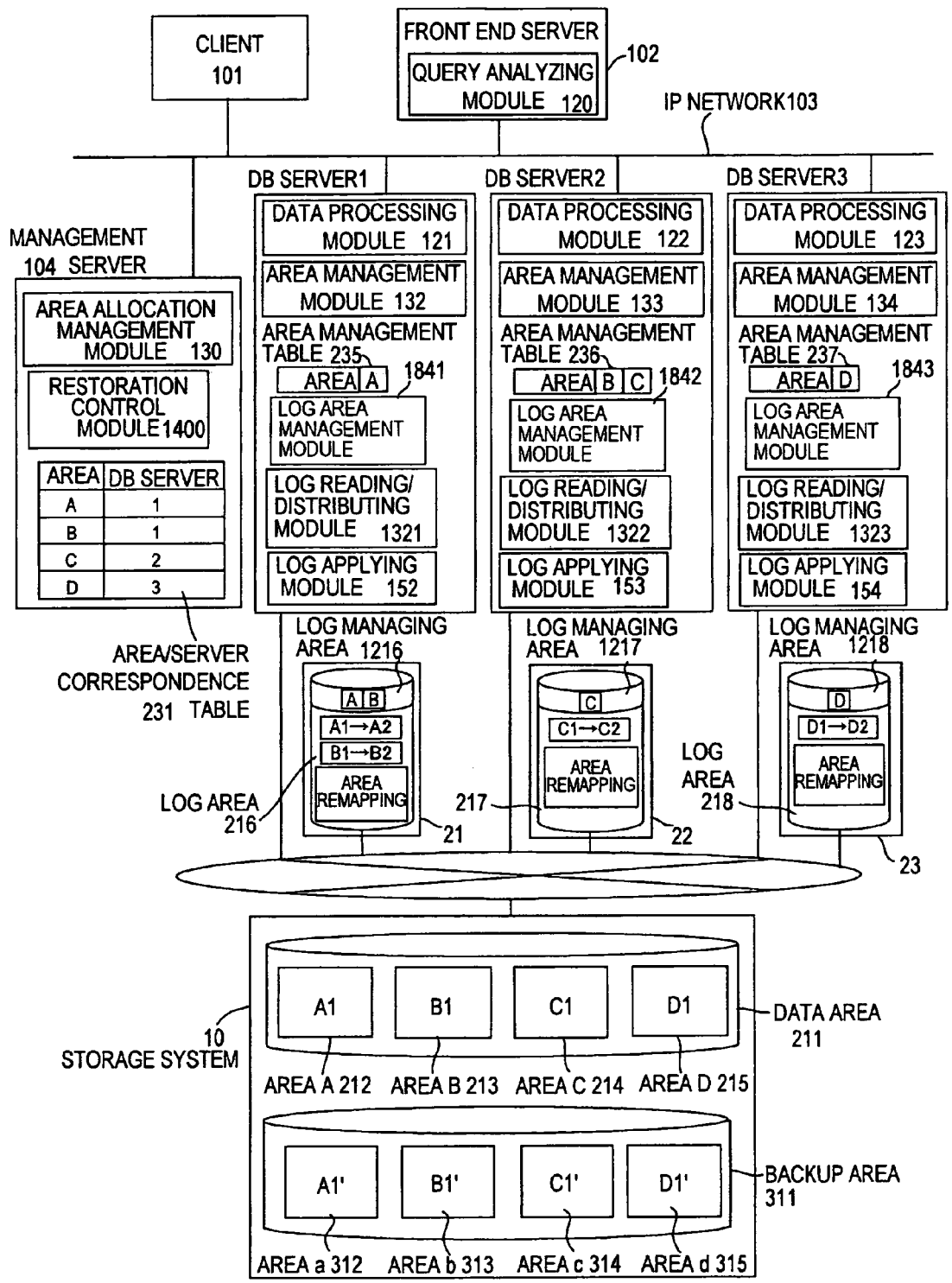
FIG. 18 is a diagram showing a configuration of a database system according to a third embodiment.

FIG. 18 shows a third embodiment. Log managing areas 1216 to 1218 are respectively provided in the storage systems 21 to 23 used to store the log areas 216 to 218 exclusively possessed by the respective DB servers 1 to 3 according to the second embodiment, and log area management modules 1841 to 1843 which respectively manage the log managing areas 1216 to 1218 and the log areas 216 to 218 are provided in the respective DB servers 1 to 3. The other configurations of the third embodiment are the same as those of the first embodiment.

A description will now be given of differences from the second embodiment. In the DB servers 1 to 3 are provided modules which initialize the log areas 216 to 218 when the DB servers 1 to 3 start to use the respective log areas 216 to 218. The log managing areas 1216 to 1218 are respectively set in the storage areas 21 to 23 to which the respective DB servers 1 to 3 have set the log areas 216 to 218. The log area management modules 1841 to 1843 respectively initialize the log managing areas 1216 to 1218 by writing the area management tables 235 to 237 when the DB servers 1 to 3 start to use the log areas 216 to 218 upon the area remapping or the like. In other words, each time area remapping occurs, histories of the area management tables 135 to 137 are respectively accumulated in the log managing areas 1216 to 1218.

Figure 21:
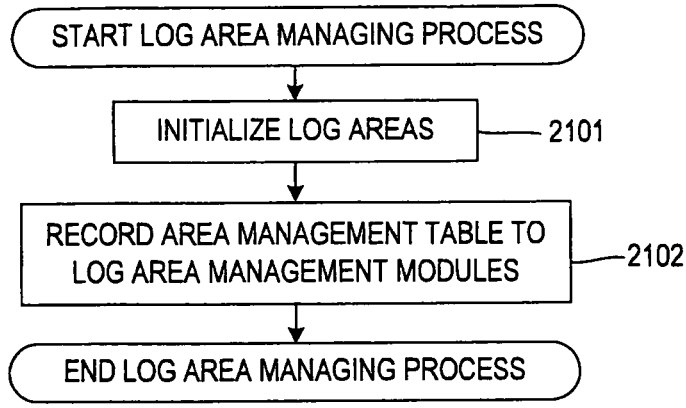
FIG. 21 is a flowchart showing an example of processing carried out by log area management modules of the respective DB servers according to the third embodiment.

FIG. 21 shows a flowchart of a log area managing process carried out by the log area management modules 1841 to 1843. The log area management modules 1841 to 1843 respectively initialize the log areas 216 to 218 (2101), and then record the area/server correspondence table 231 to the log managing areas 1216 to 1218 (2102).

Before the use of the log areas 216 to 218 start, the data area 211 has the allocation state shown in FIG. 2. On this occasion, after initializing the log areas 216 to 218, the log area management module 1841 records the allocated areas as "A, B" in the log managing area 1216, the log area management module 1842 records the allocated area as "C" in the log managing area 1217, and the log area management module 1843 records the allocated area as "D" in the log managing area 1218.

Upon the area remapping as in the first embodiment shown in FIG. 3, the area management modules 132 to 134 respectively output area remapping logs 1316 to 1318 to the respective log areas 216 to 218. Moreover, the log area management modules 1841 to 1843 respectively write new area management tables 235 to 237 in the log managing areas 1216 to 1218. As a result, the logs for the area remapping are accumulated in the log managing areas 1216 to 1218.

This embodiment is different from the first embodiment in that newly allocated areas according to the instructions from the area allocation management module 130 of the management server 104 are respectively added to the area remapping logs 1316 to 1318 output from the area management modules 132 to 134.

Upon the area remapping, the area management modules 132 to 134 respectively output the area remapping logs 1316 to 1318 to the log areas 216 to 218 according to the flowchart of the first embodiment shown in FIG. 8.

If the same area remapping as in the first embodiment shown in FIG. 3 occurs, the area management module 132 of the DB server 1 writes the newly allocated area "A" to the area remapping log 1316, the area management module 133 of the DB server 2 writes the newly allocated areas "B, C" to the area remapping log 1317, and the area management module 134 of the DB server 3 writes the same allocated area "D" to the area remapping log 1318.

Similarly, the log area management module 1841 of the DB server 1 writes the newly allocated area "A" to the log managing area 1216, the log area management module 1842 of the DB server 2 writes the newly allocated area "B, C" to the log managing area 1217, and the log area management module 1843 of the DB server 3 writes the same allocated area "D" to the log managing area 1218.

Upon the restoration process, the respective log reading/distributing modules 1321 to 1323 of the DB servers 1 to 3 can recognize the histories of the area remapping by respectively referring to the log managing areas 1216 to 1218, and can quickly recognize the change of the destinations of the logs to be forwarded by referring to the newly allocated areas in the area remapping logs 1316 to 1318.

Figure 19:
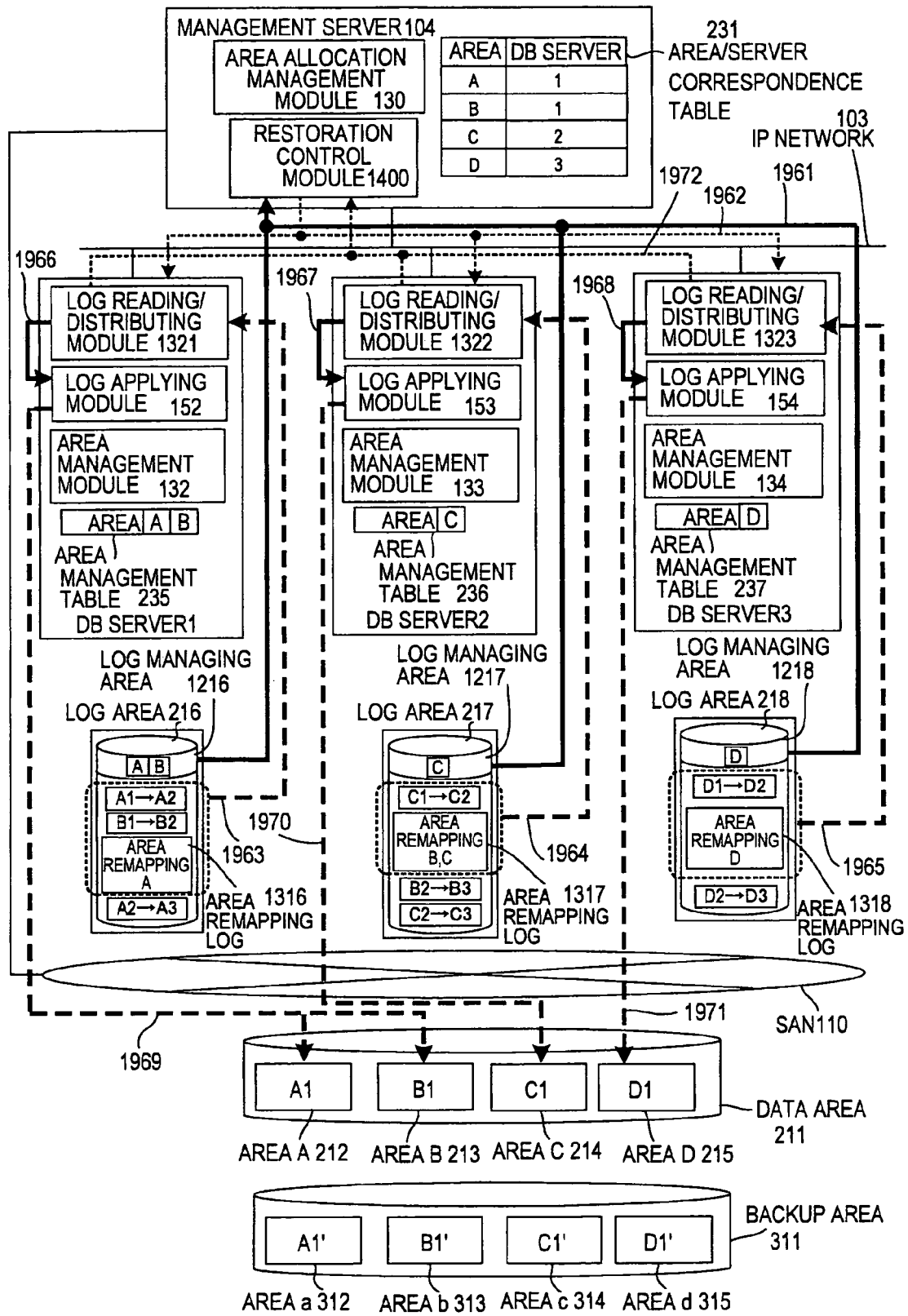
FIG. 19 is an explanatory diagram of a state of the data during a restoration process, and showing processing up to area remapping.
Figure 20:
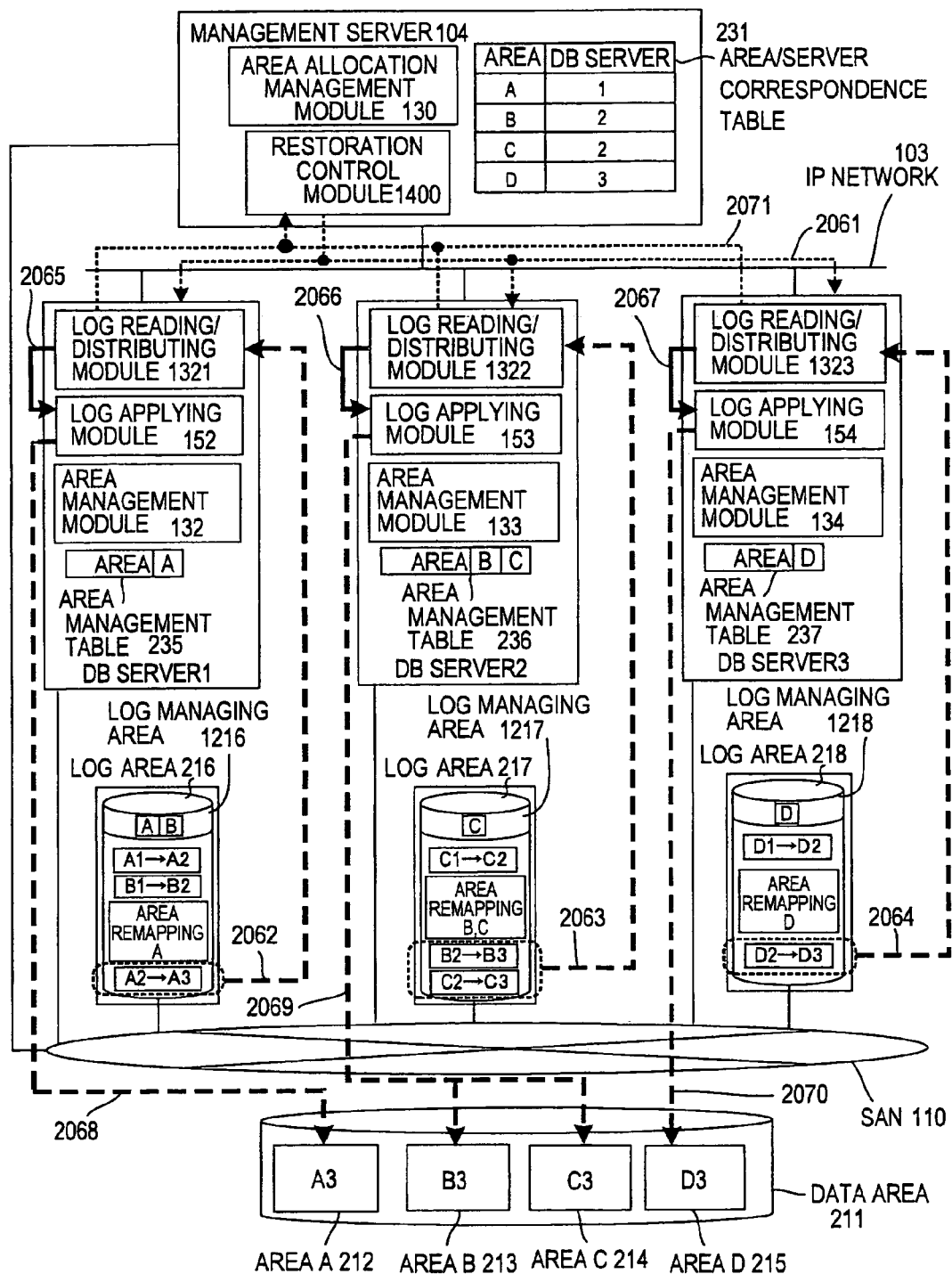
FIG. 20 is an explanatory diagram of a state of the data during the restoration process, and showing processing after the area remapping.

With reference to FIGS. 19 and 20, description will now be given of a restoration process according to the third embodiment in the case of the recovery from the failure after the state in FIG. 5 (data in databases: A3, B3, C3, and D3) as in the first embodiment.

The logs are applied by the restoration control module 1400, the log reading/distributing modules 1321 to 1323, the log applying modules 152 to 154, and the area allocation management module 130 and the area management modules 132 to 134 which realize a function to be used to move the data as in the first embodiment.

The respective log reading/distributing modules 1321 to 1323 of the DB servers 1 to 3 read the logs, and the log applying modules 152 to 154 apply the read logs. The restoration control module 1400 controls the log reading/distributing modules 1321 to 1323 and the area management modules 132 to 134, thereby successively applying the logs to restore to the allocated state when the respective logs were output.

Figure 22:
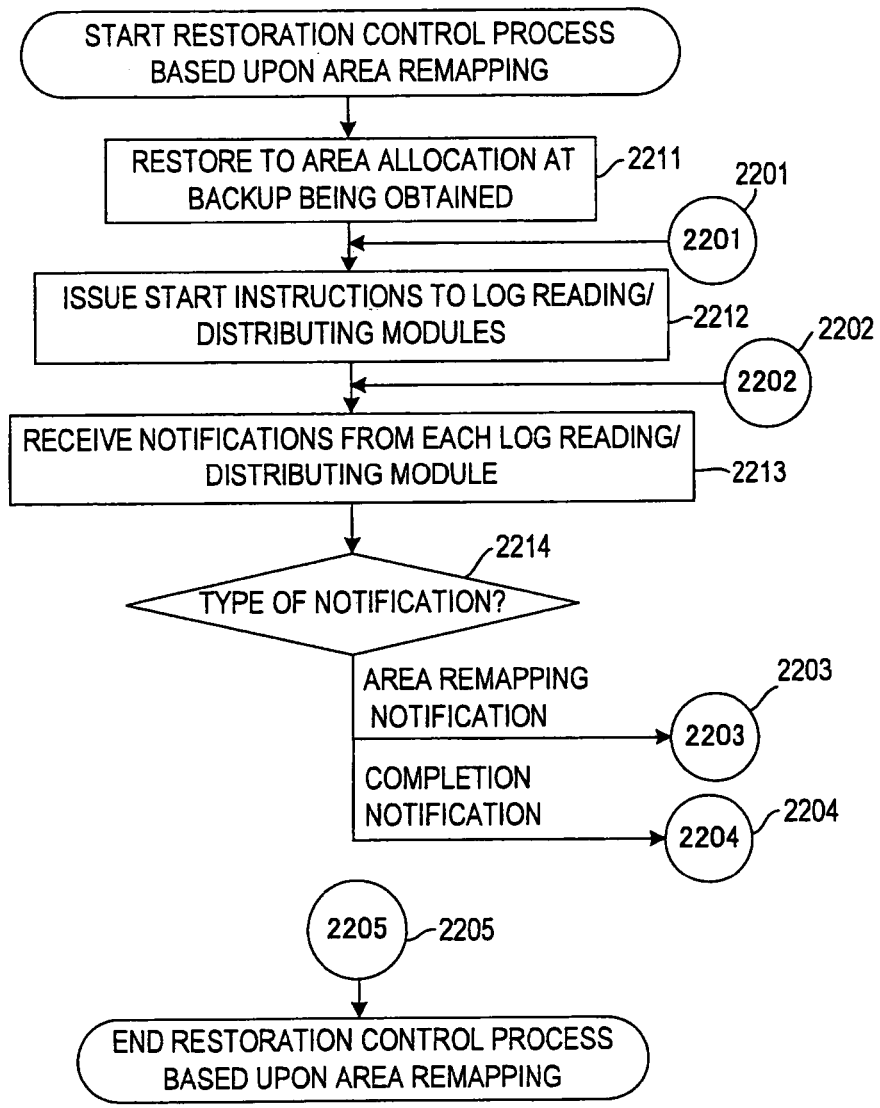
FIG. 22 is a flowchart showing an example of processing carried out by a restoration control module of a management server according to the third embodiment.
Figure 23:
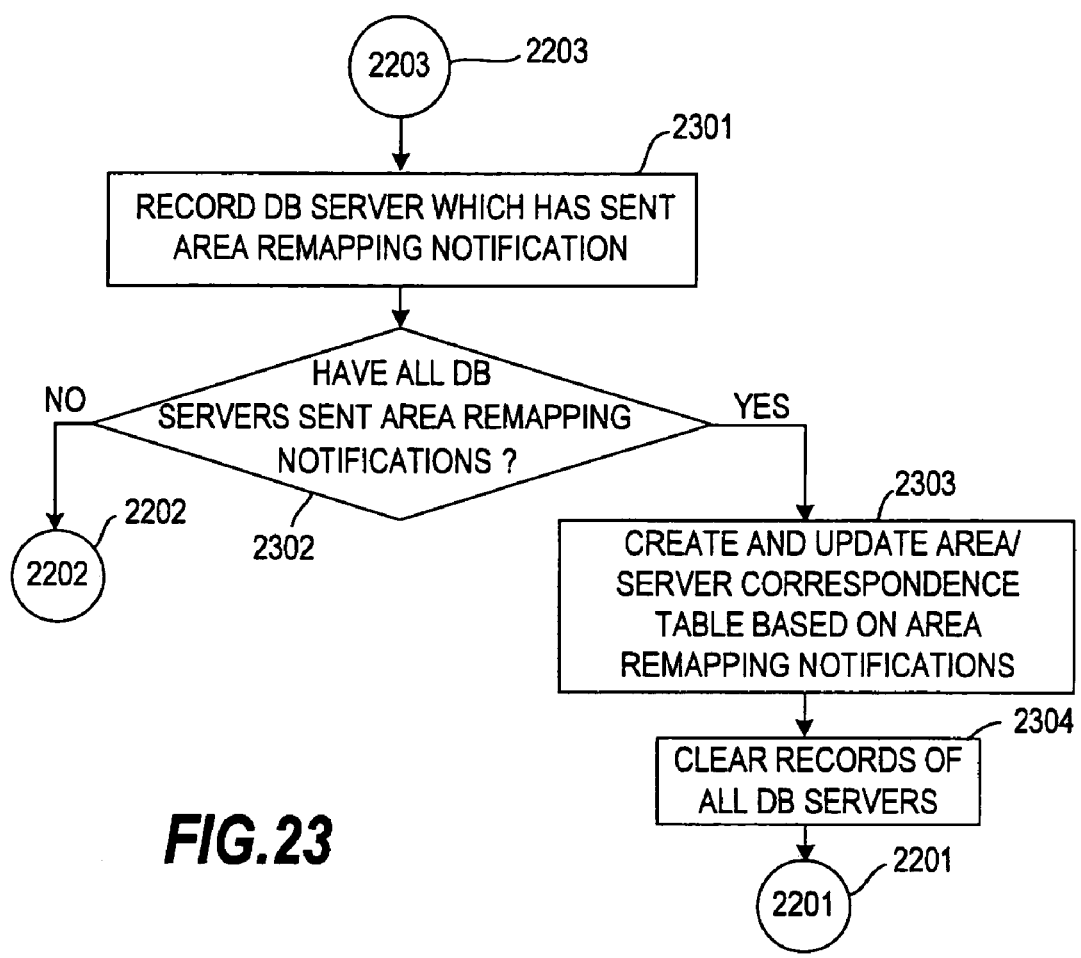
FIG. 23 is a flowchart showing another example of processing carried out by the restoration control module of the management server according to the third embodiment, which is determination of the area remapping notifications.
Figure 24:
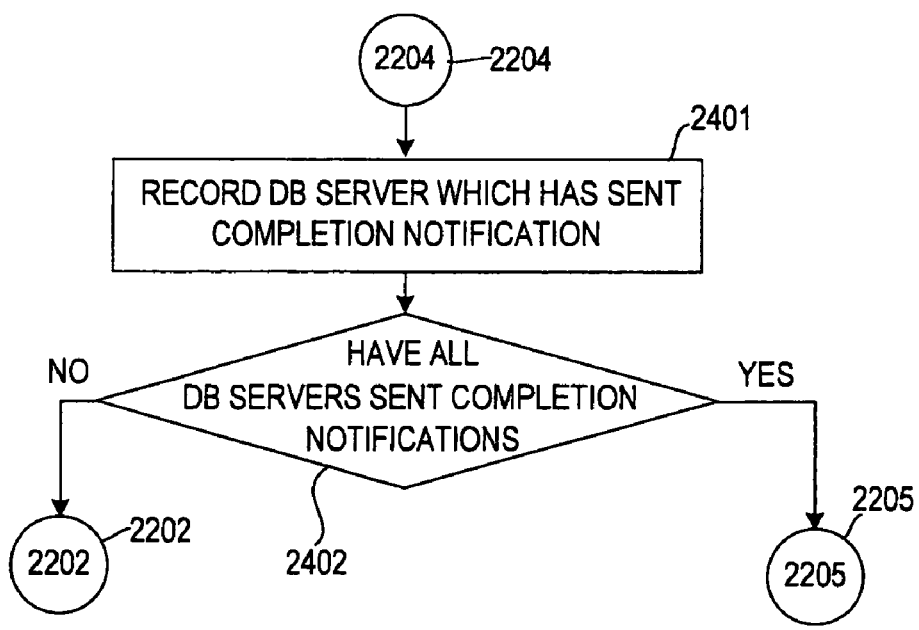
FIG. 24 is a flowchart showing still another example of processing carried out by the restoration control module of the management server according to the third embodiment, which is determination of the completion notifications.

FIGS. 22 to 24 show a flowchart of the restoration process by the restoration control module 1400 based upon the area remapping. The allocation at the time of the backup being obtained is restored by using the backup data A1' to D1' (2211). The restoration control module 1400 issues the start instructions to the log reading/distributing modules 1321 to 1323 (2212). The restoration control module 1400 waits for a notification from each the DB servers 1 to 3 (2213), and checks the type of the notification (2214). If the notification is the area remapping notification, the restoration control module 1400 proceeds to Connector 2203. On the other hand, if the notification is the completion notification, the restoration control module 1400 proceeds to Connector 2204.

FIG. 23 shows processing subsequent to Connector 2203. The restoration control module 1400 records a DB server which has transmitted the area remapping notification (2301). The recording may be carried out as in the second embodiment. The restoration control module 1400 then checks whether the area remapping notifications have been transmitted from all the DB servers 1 to 3 (2302). If the area remapping notifications have not been transmitted from all the DB servers 1 to 3, the restoration control module 1400 proceeds to Connector 2202. The restoration control module 1400 returns to the step 2213 subsequent to Connector 2202, and continue to wait for the notifications. On the other hand, if all the DB servers 1 to 3 have transmitted the area remapping notifications, the restoration control module 1400 generates the data of the area/server correspondence table 231 contained in the area remapping notifications, thereby carrying out the area remapping (2303). The restoration control module 1400 clears the records of the received area remapping notifications of all the DB servers 1 to 3 (2304), and proceeds to Connector 2201. The restoration control module 1400 returns to the step 2212 subsequent to Connector 2201, and respectively issues the resumption instructions to the log reading/distributing modules 1321 to 1323 of the respective DB servers 1 to 3.

In the case where the restoration control module 1400 determines to proceed to Connector 2201, all the DB servers 1 to 3 have transmitted the area remapping notifications, and all the log reading/forwarding modules 1321 to 1323 thus are waiting for the resumption instructions from the restoration control module 1400.

FIG. 24 shows processing subsequent to Connector 2204. The restoration control module 1400 records a DB server which has transmitted the completion notification (2401). The restoration control module 1400 then checks whether the completion notifications have been transmitted from all the DB servers 1 to 3 (2402). If the completion notifications have not been transmitted from all the DB servers 1 to 3, the restoration control module 1400 proceeds to Connector 2202. On the other hand, if the completion notifications have been transmitted from all the DB servers 1 to 3, the restoration control module 1400 proceeds to Connector 2205. The restoration control module 1400 completes the processing after Connector 2205. In other words, all the log reading/distributing modules 1321 to 1323 have completed the reading of the logs, and the log applying process has thus been completed.

Figure 25:
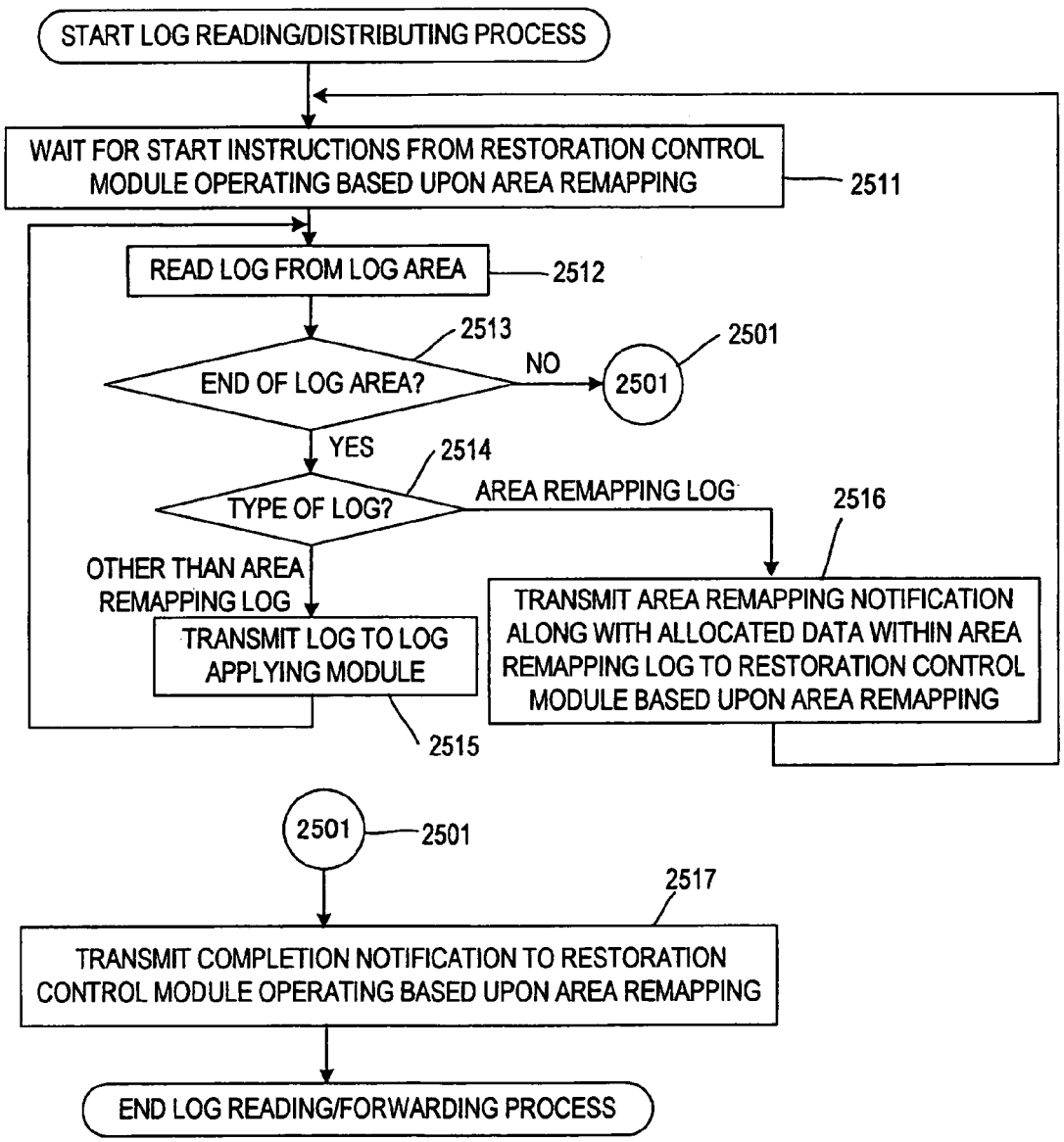
FIG. 25 is a flowchart showing an example of processing carried out by the log reading/distributing modules of the respective DB servers according to the third embodiment.

FIG. 25 is a flowchart showing the distribution process by the log reading/distributing modules 1321 to 1323. After the process starts, the log reading/distributing modules 1321 to 1323 wait for the start instructions of the restoration process from the restoration control module 1400 (2511). Upon receiving the start instructions, each of the log reading/distributing modules 1321 to 1323 reads the log from the corresponding one of the log areas 216 to 218 (2512), and checks whether the log has been read successfully (2513). If the reading failed, each of the log reading/distributing modules 1321 to 1323 assumes that all logs have been read, and transmits the completion notification to the restoration control module 1400 (2517). On the other hand, if the reading was successful, each of the log reading/distributing modules 1321 to 1323 checks whether the read log is the corresponding one of the area remapping logs (2514). If the log is the corresponding one of the area remapping logs, each of the log reading/distributing modules 1321 to 1323 transmits the area remapping notification to the restoration control module 1400 (2516), and returns to the step 2511. On the other hand, if the log is not the corresponding one of the area remapping logs 1316 to 1318, each of the log reading/distributing modules 1321 to 1323 transmits the log to the corresponding one of the log applying modules 152 to 154 within the same DB server (2515), and returns to the step 2512.

With reference to FIGS. 19 and 20, a description will now be given of an overall flow of the restoration process.

The restoration control module 1400 uses the backup data A1' to D1' in the backup area 311 to restore the data in the data area 211 to the states when the backup data were obtained, thereby restoring the DB servers 1 to 3 and the area allocation states of the data area 211 to the states when the backup data were obtained. The area allocation states upon the backup data being obtained are stored in the log managing areas 1216 to 1218, and the restoration control module 1400 reads the states (1961). As a method of reading of the states, the log reading/distributing modules 1321 to 1323 of the respective DB servers 1 to 3 may respectively read the states from the log managing areas 1216 to 1218, and then forward the data of the states. Alternatively, if the management server 104 can directly read the states via the SAN 110 or the like, the restoration control module 1400 may directly read the states. Once the restoration control module 1400 obtains the area allocation upon the backup being obtained, the restoration control module 1400 causes the area allocation management module 130 to change the allocation of the data areas. As a result, the area/server correspondence table 231 and the area management tables 235 to 237 are updated. The restoration control module 1400 operating based upon the area remapping then issues the start instructions of the restoration process to the respective log reading/distributing modules 1321 to 1323 of the DB servers 1 to 3 (1962).

Upon receiving the start instructions, the log reading/distributing modules 1321 to 1323 respectively start reading the logs from the log areas 216 to 218, and forwarding the read logs to the log applying modules 152 to 154 within the same DB servers until reading the area remapping logs 1316 to 1318. The log reading/distributing modules 1321 to 1323 read the logs from the log areas 216 to 218 (1963), and transmit the read logs to the log applying modules 152 to 154 (1966).

Upon reading the area remapping logs 1316 to 1318, the log reading/distributing modules 1321 to 1323 respectively transmit the area remapping notifications along with the data in the area management tables 235 to 237 included in the area remapping logs 1316 to 1318 to the restoration control module 1400 (1972).

Upon receiving the logs transmitted from the log reading/distributing modules 1321 to 1323, the log applying modules 152 to 154 respectively apply the logs to the areas allocated. The log applying module 152 updates the areas A212 and B213 (1969), the log applying module 153 updates the area C214 (1970), and the log applying module 154 updates the area D215 (1971).

Upon having received the area remapping notifications from the three DB servers 1 to 3, the restoration control module 1400 carries out an update to the next area allocation based upon the data in the area management tables 235 to 237 included in the area remapping notifications. FIG. 20 shows the state after the restoration control module 1400 has received all the area remapping notifications in FIG. 19, and has updated the allocation to the next state. According to the data included in the area remapping logs 1316 to 1318, the restoration control module 1400 updates the area/server correspondence table 231 and the area management tables 235 to 237 existing in the respective DB servers 1 to 3.

The restoration control module 1400 then updates the DB servers 1 to 3 and the area A212 to D215 in the data area 211 based upon the area/server correspondence table 231, and then, respectively issues the resumption instructions to the log reading/distributing modules 1321 to 1323 (2061).

Upon receiving the resumption instructions, the log reading/distributing modules 1321 to 1323 respectively start reading the logs from the log areas 216 to 218, and forwarding the read logs to the log applying modules 152 to 154 within the same DB servers until reading area remapping logs. Upon having read all the logs in the log areas 216 to 218, the log reading/distributing modules 1321 to 1323 respectively transmit the completion notifications to the restoration control module 1400 (2071).

Upon receiving the logs transmitted from the log reading/distributing modules 1321 to 1323, the log applying modules respectively apply the logs to the areas allocated to the respective DB servers 1 to 3. The log applying module 152 updates the area A212 (2068), the log applying module 153 updates the areas B213 and C214 (2069), and the log applying module 154 updates the area D215 (2070). A difference from FIG. 19 is that the area/server correspondence table 231 and the respective area management tables 235 to 237 are updated, and the DB server which updates the area B213 is changed. While the log applying module 152 updates the area B213 in FIG. 19, the log applying module 153 updates the area B213 in FIG. 20.

Upon receiving the completion notifications from the three DB servers 1 to 3, the restoration control module 1400 completes the processing. As a result, the restoration process is completed.

Instead of recording the data of the area remapping in the log managing areas 1216 to 1218 and the area remapping logs 1316 to 1318, the area management modules 132 to 134 may record the histories of the area allocations in the normal operation, and the restoration control module 1400 may carry out the restoration during the restoration process while updating the area allocations according to the recorded histories.

As described above, according to the third embodiment, since the information on the area allocations is included in the area remapping logs 1316 to 1318, and the histories of the area remapping are stored in the log managing areas 1216 to 1218, it is possible to restore the data by applying the logs after restoring the allocations between the DB servers 1 to 3 and the data area 211 to those at the time when the backup was obtained in the restoration process. As a result, since it is possible to apply the logs without forwarding the logs of the respective DB servers 1 to 3 to other DB servers, it is possible to reduce the loads on the IP network 103 and the SAN 110, resulting in a higher speed restoration process. Moreover, as in the second embodiment, since the combination and the sort of the logs is not necessary, it is possible to realize an extremely high-speed restoration process while the load on the computer resources is largely reduced compared with the conventional case.

Fourth Embodiment

Figure 26:
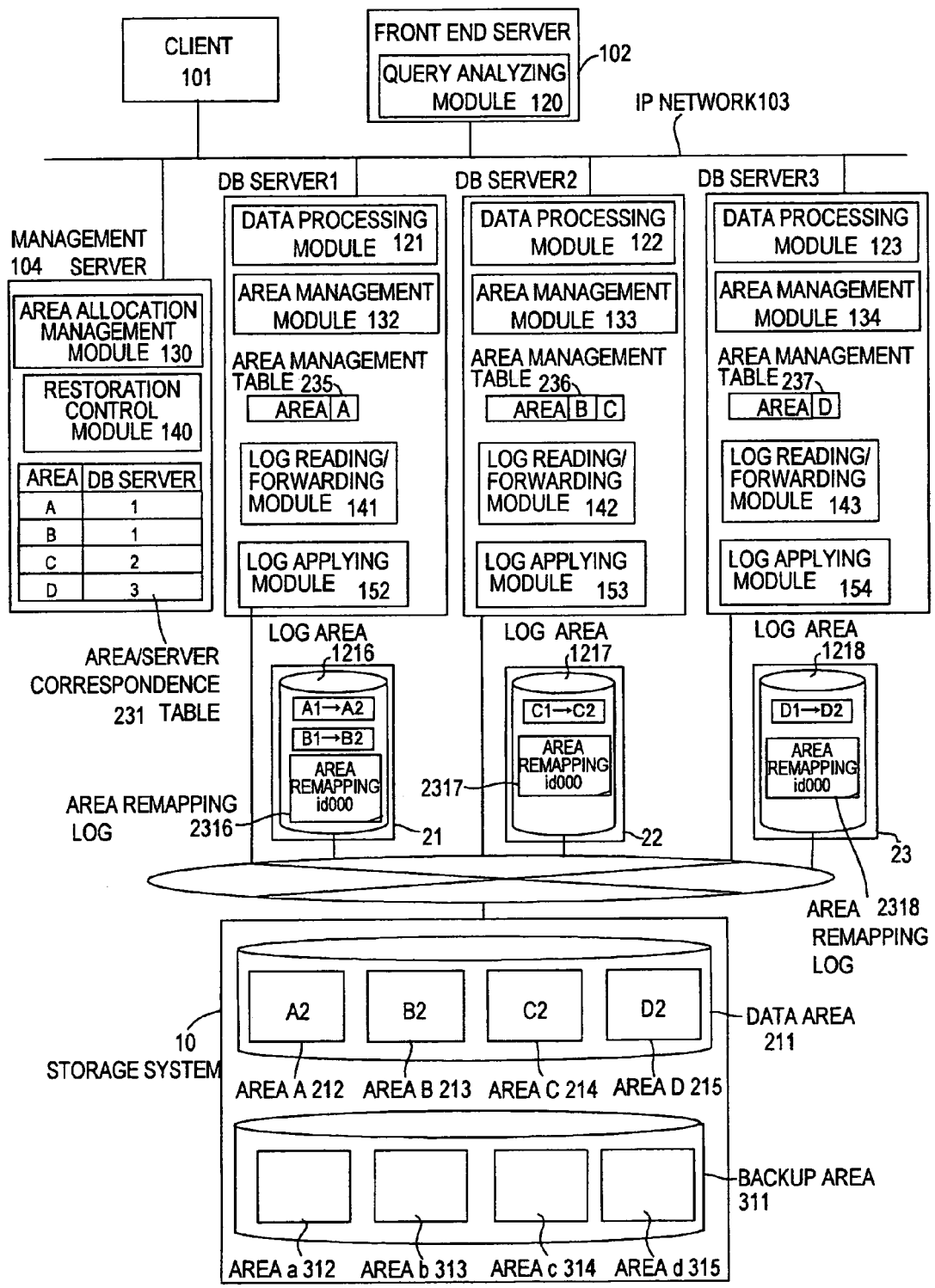
FIG. 26 is a diagram showing a configuration of a database system according to a fourth embodiment.

FIG. 26 shows a fourth embodiment. According to the fourth embodiment, identifiers (ID's) are attached to the area remapping logs 316 to 318 according to the first embodiment, and the other configurations are the same as those of the first embodiment.

If a new DB server is added to the DB servers 1 to 3, or a DB server is removed from the DB servers 1 to 3, a log area is added to or removed from the log areas 216 to 218 allocated to the respective DB servers 1 to 3. In this case, a correspondence of an area remapping log in a certain log area to area remapping logs in the other log areas disappears. To overcome this problem, the ID's to be used to identify the locations within the database system are attached to area remapping logs 2316 to 2318.

FIG. 26 shows a state where the area remapping logs 2316 to 2318 with the ID being attached are output. The same ID ("id000" in the figure) is attached to indicate that the area remapping logs 2316 to 2318 are output upon the same area remapping.

In this case, the area allocation management module 130 of the management server 104 manages the ID's. Upon the area remapping, the area allocation management module 130 notifies the respective area management modules 132 to 134 of the DB servers 1 to 3 of the area remapping as well as the ID's. The area management modules 132 to 134 respectively output the area remapping logs 2316 to 2318 with the received ID's being attached to the log areas 216 to 218 of the respective DB servers 1 to 3.

Upon the restoration process, the restoration control module 140 can identify added DB servers and removed DB servers by asking the area allocation management module 130 for the ID's of the area remapping logs 2316 to 2318 of the respective log areas 216 to 218.

It should be noted that the ID according to the fourth embodiment may be attached to the area remapping logs 1316 to 1318 according to the third embodiment.

Fifth Embodiment

Figure 27:
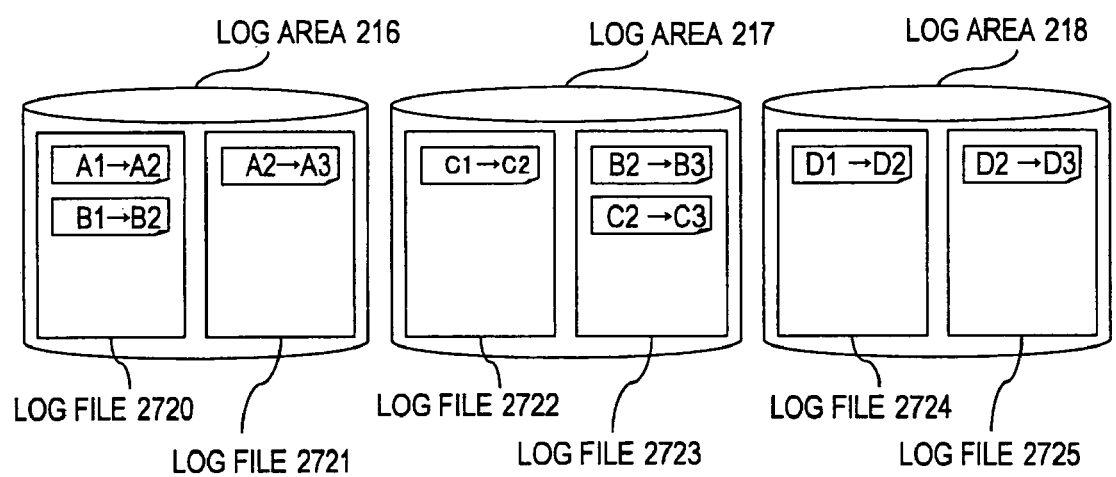
FIG. 27 is an explanatory diagram of log areas according to a fifth embodiment.

FIG. 27 shows a fifth embodiment. According to the fifth embodiment, plural write areas (log files) are provided in the log areas 216 to 218 according to the first embodiment, the area to which the logs are written is switched upon area remapping, and the other configurations are the same as those of the first embodiment.

FIG. 27 shows a state where the log areas 216 to 218 according to the first embodiment shown in FIG. 1 are divided upon the switching of the log files.

The log areas 216 to 218 respectively include two log files 2720 and 2321, 2722 and 2723, and 2724 and 2725. The logs are output to the log files 2720, 2722, and 2724 before the area remapping. Upon the area remapping, the log files 2720, 2722, and 2724 are respectively switched to the log files 2721, 2723, and 2725, and thereafter the logs are output to the log files 2721, 2723, and 2725. The log files are switched upon the area remapping, and the logs are thus stored to the different log files before and after the area remapping, thereby separating log groups before and after the area remapping.

If the operation is based upon plural log files, the log files are also switched due to events other than the area remapping in general. For example, log files are forced to be switched if a free space for the log files is exhausted, or the log files are saved. In a managing area of a log file is recorded the fact that the log file is switched due to the area remapping to distinguish the switching of the log file due to the area remapping of the ends of files from the switching due to other event. For example, a bit pattern may be recorded at the beginning of the log file, or the switching due to the area remapping may be recorded at a location used to record metadata of the log file (data indicating attributes of the file such as the file size and the owner). The generation of the log file is managed according to a control file, and the switching due to the area remapping may be managed by the control file.

Upon the restoration process, instead of detecting the area remapping log, the ends of the log files which are caused by the area remapping may be detected as boundaries between logs. Upon reading logs from the respective log areas 216 to 218, the log reading/forwarding modules 141 to 143 respectively read the logs from the log files 2720, 2722, and 2724. Upon detecting the ends of the respective log files 2720, 2722, and 2724, the log reading/forwarding modules 141 to 143 assume that area remapping logs have been read, transmit the area remapping logs, and wait for the resumption instructions from the restoration control module 140. Upon receiving the resumption instructions, the log reading/forwarding modules 141 to 143 switch the log files to be read from the log files 2720, 2722, and 2724 to the log files 2721, 2723, and 2725, and then continue the restoration process. In this way, during the restoration process, the logs are read and applied while the log files 2720 to 2725 are being switched in the respective log areas 216 to 218.

The number of the log files in the respective log areas 216 to 218 is not limited to two, and can be set to an arbitrary number. Alternatively, the number of the log files in the respective log areas 216 to 218 may be increased upon each area remapping.

Sixth Embodiment

Figure 28:
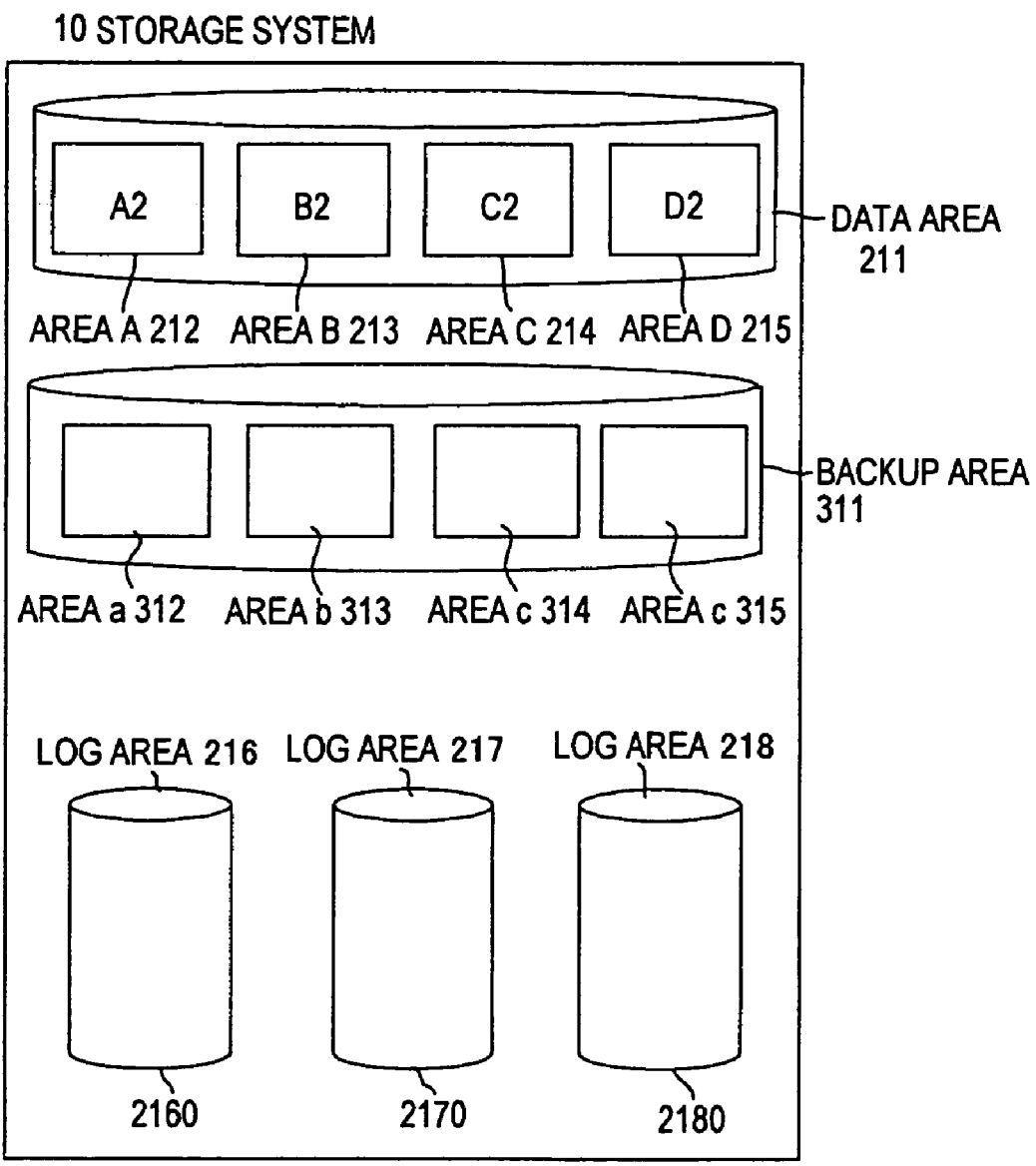
FIG. 28 is an explanatory diagram of a storage system according to a sixth embodiment.

FIG. 28 shows a sixth embodiment. According to the sixth embodiment, the storage systems 21 to 23 according to the first embodiment are integrated into the storage system 10, and non-shared volumes 2160 to 2180 are respectively used as the log areas 216 to 218, and the other configurations are the same as those of the first embodiment.

In this case, in the storage system 10 is set the data area 211 on a volume shared by the DB servers 1 to 3, in the data area 211 are set the areas (data storage areas) A212 to D215 exclusively allocated to the DB servers 1 to 3, and in the non-shared volumes 2160 to 2180 exclusively possessed by the respective DB servers 1 to 3 are set the log areas 216 to 218.

Even if the correspondence between the DB servers 1 to 3 and the data storage areas A212 to D215 changes as a result of the area remapping, the logs output from the respective DB servers 1 to 3 are stored in the log areas 216 to 217 exclusively possessed by the respective DB servers 1 to 3 as in the first embodiment.

As described above, this invention can be applied to a management system for a shared-nothing type database, and can realize the restoration process based upon the backup of the data areas before area remapping and logs accumulated subsequent to the backup was obtained without sorting and combining the logs.

While the present invention has been described in detail and pictorially in the accompanying drawings, the present invention is not limited to such detail but covers various obvious modifications and equivalent arrangements, which fall within the purview of the appended claims.

What is claimed is:

1. A data processing system, comprising:
   a plurality of database servers that are connected with each other via a network;
   a plurality of data storage areas that store data of the database servers; and
   a management server that manages a correspondence between the database servers and the data storage areas, wherein:
   the management server comprises an area allocation management module that allocates the plurality of data storage areas to the plurality of database servers that have access to the data storage areas to be allocated, and notifies the database servers of the data storage areas to be allocated;

the database server comprises:
- an area management module that holds the data storage area allocated to the database server by the area allocation management module; and
- a data processing module that stores data in the data storage area held by the area management module, refers to and updates the stored data, and, upon the update, stores a log indicating an update history of the data in a log area set respectively for the database servers in advance; and upon receiving a notification of a change of the allocation of the data storage area from the area allocation management module of the management server, the area management module stores an area remapping log indicating the change of the allocation of the data storage area in the log area.

2. The data processing system according to claim 1, wherein:
the management server comprises a restoration control module that carries out a restoration process for a group of the logs stored in the log area set respectively for the database servers, and separated by the area remapping logs as a unit; and
the database server restores data by applying the log in the log area to the data storage area according to an instruction from the restoration control module.

3. The data processing system according to claim 1, wherein:
the data storage areas is set to a first storage system that can be shared by the respective database servers; and
the log area is set to a second storage system exclusively possessed by the respective database servers.

4. The data processing system according to claim 2, wherein:
the database server comprises:
- a log reading/forwarding module that reads a log from the log area based upon the instruction from the restoration control module, and forwards the read log to the restoration control module if the read log does not correspond to the data storage area held by the area management module; and
- a log applying module that applies a log forwarded from the restoration control module, and the log read by the log reading/forwarding module, and corresponding to the data storage area held by the area management module to the data storage area allocated to the database server; and the restoration control module transmits the received log to the database server subject to the application of the received log based upon the setting by the area allocation management module.

5. The data processing system according to claim 2, wherein:
the database server comprises a log applying module that applies a log forwarded from the restoration control module to the data storage area allocated to the database server;
the management server comprises a log reading module that reads the log from the log area of the database server based upon an instruction from the restoration control module; and
the restoration control module transmits the read log to the database server subject to the application of the read log based upon the setting by the area allocation management module.

6. The data processing system according to claim 4, wherein:
the log reading/forwarding module transmits a read log corresponding to the data storage area held by the area management module to the log applying module, and reads the next log upon receiving an instruction from the restoration control module after forwarding an area remapping log to the restoration control module; and
upon receiving an area remapping log, the restoration control module receives area remapping logs from the respective log reading/forwarding modules of all the database servers, and then, respectively transmits the instructions to resume the reading of the log to the log reading/forwarding modules.

7. The data processing system according to claim 2, wherein the database server comprises:
a log forwarding information storage module that obtains the correspondence of the data storage areas allocated to the database servers from the area allocation management module of the management server based upon an instruction from the restoration control module;
a log reading/distributing module that reads a log from the log area, and forwards the read log to the database server based upon the correspondence in the log forwarding information storage module; and
a log applying module that applies a log received from other database server and the log transmitted from the log reading/distributing module to the data storage area allocated to the database server.

8. The data processing system according to claim 7, wherein:
upon forwarding an area remapping log, the log reading/distributing module notifies the restoration control module of the reading of the area remapping log, and then, reads the next log upon receiving an instruction from the restoration control module; and
upon receiving a notification of reading of an area remapping log, the restoration control module receives notifications of the reading of the area remapping log from the respective log reading/distributing modules of all the database servers, and then, respectively transmits the instructions to resume the reading of the log to the log reading/distributing modules.

9. The data processing system according to claim 1, wherein:
the log area includes a log managing area used to store a history of the data storage area allocated to the database server; and
upon receiving a notification of a change of the allocation of the data storage area from the area allocation management module of the management server, the area management module stores information on new data storage area in the log managing area.

10. The data processing system according to claim 9, wherein:
the management server comprises a restoration control module that instructs the respective database servers to carry out a restoration process;
on the database server, based upon the instruction from the restoration control module, the area management module sets the data storage area to which the database server has access based upon the history of the data storage area stored in the log managing area;
the database server comprises:
a log reading module that reads a log from the log area; and
a log applying module that applies the log read by the log reading module to the data storage area set to the area management module; and the area management module restores data while changing the data storage area according to the history of the data storage area upon reading the area remapping log.

11. The data processing system according to claim 1, wherein the area management module adds an identifier to an area remapping log, and then stores the area remapping log to the log area.

12. A data processing system, comprising:
a plurality of database servers that are connected with each other via a network;
a plurality of data storage areas that store data of the database servers; and
a management server that manages a correspondence between the database servers and the data storage areas, wherein:
the management server comprises: an area allocation management module that allocates the plurality of data storage areas to the plurality of database servers that have access to the data storage areas to be allocated, and notifies the database servers of the data storage areas to be allocated;
the database server comprises:
an area management module that holds the data storage area allocated to the database server by the area allocation management module; and
a data processing module that stores data in the data storage area held by the area management module, refers to and updates the stored data, and, upon the update, stores a log indicating an update history of the data in a log area set respectively for the database servers in advance;
the log area set respectively for the database servers comprises a plurality of the log areas; and
upon receiving a notification of a change of the allocation of the data storage area from the area allocation management module of the management server, the area management module switches the log area to another log area.

13. The data processing system according to claim 12, wherein:
the management server comprises a restoration control module that instructs the respective database servers to carry out a restoration process;
the database server comprises:
a log reading module that reads a log from the log area based upon the instruction from the restoration control module; and
a log applying module that applies the log read by the log reading module to the data storage area set to the area management module; and
upon reading an area remapping log, the log reading module switches the log area.

14. A database managing method used for a database in which a plurality of database servers have access to a plurality of data storage areas allocated by a management server, comprising the steps of:
causing the management server to allocate the plurality of data storage areas to the plurality of database servers that have access to the data storage area to be allocated;
causing the database server to store data to the allocated data storage area, and to refer to and update the stored data;
causing the database server to store a log indicating an update history of the data in a log area set in advance to the respective database severs upon the update; and
causing the database server to store an area remapping log indicating a change of the allocation of the data storage area in the log area upon receiving a notification of the change of the allocation of the data storage area from the management server.

15. The database managing method according to claim 14, further comprising the steps of:
causing the management server to instruct the database server to carry out a restoration process for a group of the logs stored in the log areas set respectively for the database servers, and separated by the area remapping logs as a unit; and
causing the database server to apply the log stored in the log area to the data storage area according to the instruction to restore data.

16. The database managing method according to claim 15, further comprising the steps of:
causing the database server to read a log from the log area set for the respective database servers based upon the instruction of the restoration process;
causing the database server to transmit the read log to the management server if the read log does not correspond to the data storage area allocated to the database server;
causing the management server to forward the log received from the database server to a database server which is allocated to a data storage area to which the received log are to be applied based upon the correspondence between the database servers and the data storage areas allocated thereto; and
causing the database server to apply the log forwarded from the management server and the read log corresponding to the data storage area allocated to the database server to the data storage area allocated to the database server.

17. The database managing method according to claim 15, further comprising the steps of:
causing the database server to obtain correspondence of the data storage areas allocated to the databases server as log forwarding information from the management server based upon the instruction of the restoration process;
causing the database server to read a log from the log area set to the respective database servers;
causing the database server to transmit the read log to another management server based upon the log forwarding information if the read log does not correspond to the data storage area allocated to the database server; and
causing the database server to apply the log forwarded from another database server and the read log corresponding to the data storage area allocated to the database server to the data storage area allocated to the database server.

18. The data processing system according to claim 14, wherein:
the step of causing the database server to store an area remapping log to the log area is to cause the database server to store information on a new data storage area as a history of the data storage area in a log managing area set in advance corresponding to the log area if the database server receives the notification of a change of the allocation of the data storage area.

19. The database managing method according to claim 18, further comprising the steps of:
causing the database server to read a history of the data storage area from the log managing area based upon the instruction of the restoration process;

causing the database server to change the data storage area allocated to the database server based upon the history;

causing the database server to read a log from the log area set to the respective database servers; and causing the database server to restore data while changing the data storage area according to the history of the data storage area upon the read log being the area remapping log.

20. The database managing method according to claim 15, further comprising the steps of:

causing the database server to read a log from the log area set for the respective database servers based upon the instruction of the restoration process;

causing the database server to switch a plurality of areas set in the log area if the log is the area remapping log; and causing the database server to apply the log to the data storage area allocated to the database server.

* * * * *